(12) United States Patent
Anderson

(10) Patent No.: US 8,437,879 B2
(45) Date of Patent: May 7, 2013

(54) SYSTEM AND METHOD FOR PROVIDING PRESCRIBED RESOURCES TO PLANTS

(75) Inventor: Noel Wayne Anderson, Fargo, ND (US)

(73) Assignee: Deere & Company, Moline, IL (US)

( * ) Notice: Subject to any disclaimer, the term of this patent is extended or adjusted under 35 U.S.C. 154(b) by 434 days.

(21) Appl. No.: 12/427,051

(22) Filed: Apr. 21, 2009

(65) Prior Publication Data

US 2010/0268390 A1  Oct. 21, 2010

(51) Int. Cl.
*G05D 11/00* (2006.01)
*G05D 7/00* (2006.01)
*B05B 9/03* (2006.01)
*B05B 3/00* (2006.01)
*A01C 23/00* (2006.01)

(52) U.S. Cl.
USPC ........ 700/284; 700/283; 239/146; 239/225.1; 239/148; 701/50; 56/10.2 A; 56/10.2 D

(58) Field of Classification Search .......... 700/282–284; 701/50, 207, 213, 223; 239/61, 67, 76, 146, 239/159, 225.1; 111/129, 170, 177, 200; 56/10.2 A, 10.2 D, 14.3
See application file for complete search history.

(56) References Cited

U.S. PATENT DOCUMENTS

| | | | |
|---|---|---|---|
| 3,674,652 A | | 7/1972 | Brown |
| 3,931,413 A | * | 1/1976 | Frick et al. .................... 514/558 |
| 4,067,714 A | * | 1/1978 | Willard, Sr. ....................... 71/24 |
| 4,083,494 A | * | 4/1978 | Ballu ............................ 239/156 |
| 4,146,383 A | * | 3/1979 | Hanway et al. ................... 71/29 |
| 4,150,970 A | * | 4/1979 | Ries et al. ..................... 504/353 |
| 4,175,394 A | * | 11/1979 | Wiesboeck .................... 62/50.5 |
| 4,286,530 A | * | 9/1981 | Conley .......................... 111/200 |
| 4,315,599 A | | 2/1982 | Biancardi |
| 4,342,176 A | | 8/1982 | Wolfe |
| 4,358,054 A | * | 11/1982 | Ehrat ............................ 239/155 |
| 4,385,500 A | * | 5/1983 | Kjelgaard et al. ............. 62/50.5 |
| 4,398,384 A | * | 8/1983 | Klinner ......................... 56/14.5 |
| 4,433,552 A | | 2/1984 | Smith |
| 4,516,723 A | * | 5/1985 | Hesse ............................. 239/77 |

(Continued)

FOREIGN PATENT DOCUMENTS

| | | |
|---|---|---|
| DE | 3830647 A1 | 3/1990 |
| DE | 4413739 A1 | 10/1995 |
| DE | 10002880 C1 | 6/2001 |
| DE | 10148747 A1 | 4/2003 |
| DE | 10221948 A1 | 11/2003 |

(Continued)

OTHER PUBLICATIONS

U.S. Appl. No. 12/427,043, filed Apr. 21, 2009, Anderson.

(Continued)

*Primary Examiner* — Mohammad Ali
*Assistant Examiner* — Kelvin Booker
(74) *Attorney, Agent, or Firm* — Yee & Associates, P.C.; Jeremy J. Westlake

(57) ABSTRACT

Therefore, the illustrative embodiments provide a computer implemented method and system for providing an application of a resource to plants. A plurality of per plant prescriptions for a plurality of plants are received and a source is selected to fulfill the plurality of per plant prescriptions to form a selected source. Movement of a mobile utility vehicle is controlled to the selected source, the resource is obtained, and movement of the mobile utility vehicle is controlled to each plant in the plurality of plants. The resource is applied from the mobile utility vehicle to each plant according to the per plant prescription.

20 Claims, 12 Drawing Sheets

U.S. PATENT DOCUMENTS

| | | | |
|---|---|---|---|
| 4,588,127 A * | 5/1986 | Ehrat | 239/156 |
| 4,610,122 A | 9/1986 | De Clercq | |
| 4,638,594 A | 1/1987 | Hughet et al. | |
| 4,704,986 A * | 11/1987 | Remp et al. | 118/318 |
| 4,757,688 A | 7/1988 | Basiulis et al. | |
| 4,832,263 A * | 5/1989 | Poynor | 239/197 |
| 4,871,447 A * | 10/1989 | Adamache | 209/166 |
| 4,903,903 A * | 2/1990 | Benen | 241/101.76 |
| 4,949,656 A * | 8/1990 | Lyle et al. | 239/727 |
| 4,970,973 A * | 11/1990 | Lyle et al. | 239/726 |
| 4,982,898 A * | 1/1991 | Ballu | 239/77 |
| 4,992,942 A * | 2/1991 | Bauerle et al. | 700/284 |
| 5,076,497 A * | 12/1991 | Rabitsch | 239/310 |
| 5,092,422 A * | 3/1992 | Hood et al. | 172/306 |
| 5,140,917 A * | 8/1992 | Swanson | 111/187 |
| 5,248,090 A * | 9/1993 | Williamson | 239/168 |
| 5,255,857 A * | 10/1993 | Hunt | 239/731 |
| 5,355,815 A | 10/1994 | Monson | |
| 5,442,552 A * | 8/1995 | Slaughter et al. | 701/50 |
| 5,601,236 A | 2/1997 | Wold | |
| 5,740,038 A * | 4/1998 | Hergert | 700/284 |
| 5,840,102 A * | 11/1998 | McCracken | 95/268 |
| 5,870,302 A | 2/1999 | Oliver | |
| 5,884,224 A * | 3/1999 | McNabb et al. | 700/284 |
| 5,902,343 A * | 5/1999 | Hale et al. | 701/50 |
| 5,907,925 A * | 6/1999 | Guyot | 239/170 |
| 5,913,915 A * | 6/1999 | McQuinn | 701/50 |
| 5,915,313 A * | 6/1999 | Bender et al. | 701/50 |
| 5,919,242 A | 7/1999 | Greatline et al. | |
| 5,924,371 A * | 7/1999 | Flamme et al. | 701/50 |
| 5,927,603 A * | 7/1999 | McNabb | 239/63 |
| 5,979,703 A * | 11/1999 | Nystrom | 701/50 |
| 5,991,687 A * | 11/1999 | Hale et al. | 701/207 |
| 5,995,895 A * | 11/1999 | Watt et al. | 701/50 |
| 6,039,212 A | 3/2000 | Singh | |
| 6,079,340 A * | 6/2000 | Flamme et al. | 701/50 |
| 6,089,743 A * | 7/2000 | McQuinn | 701/50 |
| 6,116,519 A * | 9/2000 | Williamson | 239/168 |
| 6,122,581 A * | 9/2000 | McQuinn | 701/50 |
| 6,129,520 A * | 10/2000 | Cooper | 417/234 |
| 6,141,614 A * | 10/2000 | Janzen et al. | 701/50 |
| 6,178,253 B1 | 1/2001 | Hendrickson et al. | |
| 6,199,000 B1 | 3/2001 | Keller et al. | |
| 6,230,091 B1 * | 5/2001 | McQuinn | 701/50 |
| 6,337,971 B1 * | 1/2002 | Abts | 340/7.2 |
| 6,443,365 B1 * | 9/2002 | Tucker et al. | 239/69 |
| 6,510,367 B1 * | 1/2003 | McQuinn | 700/241 |
| 6,516,271 B2 | 2/2003 | Upadhyaya et al. | 56/10.2 A |
| 6,549,851 B2 | 4/2003 | Greensides | |
| 6,553,299 B1 * | 4/2003 | Keller et al. | 701/50 |
| 6,574,979 B2 | 6/2003 | Faqih | |
| 6,596,996 B1 | 7/2003 | Stone et al. | |
| 6,597,991 B1 | 7/2003 | Meron et al. | |
| 6,616,374 B2 * | 9/2003 | Starr | 405/36 |
| 6,666,384 B2 * | 12/2003 | Prandi | 239/726 |
| 6,671,698 B2 * | 12/2003 | Pickett et al. | 707/999.107 |
| 6,684,648 B2 | 2/2004 | Faqih | |
| 6,691,135 B2 * | 2/2004 | Pickett et al. | 707/999.006 |
| 6,755,362 B2 | 6/2004 | Krieger et al. | |
| 6,778,887 B2 | 8/2004 | Britton | |
| 6,792,395 B2 | 9/2004 | Roberts | |
| 6,802,153 B2 | 10/2004 | DuBois et al. | |
| 6,854,209 B2 * | 2/2005 | Van Horssen et al. | 47/17 |
| 6,862,083 B1 | 3/2005 | McConnell, Sr. et al. | |
| 6,877,325 B1 | 4/2005 | Lawless | |
| 6,907,319 B2 * | 6/2005 | Hoelscher et al. | 700/283 |
| 6,928,339 B2 | 8/2005 | Barker | |
| 6,941,225 B2 * | 9/2005 | Upadhyaya et al. | 56/10.2 A |
| 6,963,881 B2 * | 11/2005 | Pickett et al. | 707/999.007 |
| 6,975,245 B1 | 12/2005 | Slater et al. | |
| 6,978,794 B2 | 12/2005 | Dukes et al. | |
| 7,063,276 B2 * | 6/2006 | Newton | 239/302 |
| 7,069,692 B2 | 7/2006 | Kuiper et al. | |
| 7,089,763 B2 | 8/2006 | Forsberg et al. | |
| 7,171,912 B2 * | 2/2007 | Fraisse et al. | 700/283 |
| 7,182,274 B2 * | 2/2007 | Nies | 239/198 |
| 7,182,445 B2 | 2/2007 | Johnson et al. | |
| 7,275,042 B1 | 9/2007 | Kelly et al. | |
| 7,280,892 B2 * | 10/2007 | Bavel | 700/284 |
| 7,317,972 B2 | 1/2008 | Addink et al. | |
| 7,343,262 B2 * | 3/2008 | Baumgarten et al. | 701/50 |
| 7,408,145 B2 | 8/2008 | Holland | |
| 7,455,245 B2 | 11/2008 | Sipinski et al. | |
| 7,469,707 B2 | 12/2008 | Anderson et al. | |
| 7,565,139 B2 | 7/2009 | Neven, Sr. et al. | |
| 7,577,105 B2 | 8/2009 | Takeyoshi et al. | |
| 7,610,122 B2 * | 10/2009 | Anderson | 700/179 |
| 7,617,992 B2 | 11/2009 | Ivans | |
| 7,686,499 B2 * | 3/2010 | Dykstra et al. | 700/285 |
| 7,775,168 B2 * | 8/2010 | Sidhwa et al. | 239/172 |
| 7,805,221 B2 * | 9/2010 | Nickerson | 700/284 |
| 7,809,475 B2 | 10/2010 | Kaprielian | |
| 7,844,368 B2 * | 11/2010 | Alexanian | 700/284 |
| 7,854,108 B2 | 12/2010 | Koselka et al. | |
| 7,930,085 B2 * | 4/2011 | Anderson et al. | 701/50 |
| 7,957,850 B2 * | 6/2011 | Anderson | 700/243 |
| 8,028,470 B2 | 10/2011 | Anderson | |
| 8,170,405 B2 | 5/2012 | Harris | |
| 2002/0011075 A1 | 1/2002 | Faqih | |
| 2002/0170229 A1 | 11/2002 | Ton et al. | |
| 2003/0019408 A1 | 1/2003 | Fraisse et al. | |
| 2003/0215354 A1 | 11/2003 | Clark et al. | |
| 2003/0229434 A1 * | 12/2003 | Miedema | 56/10.2 A |
| 2004/0034459 A1 | 2/2004 | Hoelscher et al. | |
| 2004/0078092 A1 | 4/2004 | Addink et al. | |
| 2004/0231240 A1 | 11/2004 | Kuiper et al. | |
| 2005/0129034 A1 | 6/2005 | Takeyoshi et al. | |
| 2005/0187665 A1 | 8/2005 | Fu | |
| 2005/0199842 A1 * | 9/2005 | Parsons et al. | 239/69 |
| 2006/0026556 A1 | 2/2006 | Nishimura | |
| 2006/0089260 A1 * | 4/2006 | Di et al. | 504/116.1 |
| 2007/0042803 A1 | 2/2007 | Anderson | |
| 2007/0220808 A1 | 9/2007 | Kaprielian et al. | |
| 2008/0061163 A1 | 3/2008 | Kubby et al. | |
| 2008/0097653 A1 | 4/2008 | Kaprielian et al. | |
| 2008/0190020 A1 | 8/2008 | Todd | |
| 2008/0288116 A1 | 11/2008 | Nickerson | |
| 2009/0001193 A1 * | 1/2009 | Parsons et al. | 239/69 |
| 2009/0019826 A1 * | 1/2009 | Rigney | 56/13.5 |
| 2009/0179165 A1 * | 7/2009 | Parsons et al. | 251/129.04 |
| 2009/0241580 A1 | 10/2009 | Hill et al. | |
| 2009/0259483 A1 | 10/2009 | Hendrickson et al. | |
| 2009/0281672 A1 | 11/2009 | Pourzia | |
| 2009/0314862 A1 * | 12/2009 | Bauman et al. | 239/743 |
| 2010/0032493 A1 | 2/2010 | Abts | |
| 2010/0032495 A1 | 2/2010 | Abts | |
| 2010/0034466 A1 | 2/2010 | Jing et al. | |
| 2010/0109946 A1 | 5/2010 | Pande | |
| 2010/0243754 A1 | 9/2010 | Harris | |
| 2010/0263275 A1 | 10/2010 | Anderson | |
| 2010/0268391 A1 * | 10/2010 | Anderson | 700/284 |
| 2010/0268562 A1 | 10/2010 | Anderson | |
| 2010/0313799 A1 * | 12/2010 | Sidhwa et al. | 111/127 |
| 2010/0332475 A1 | 12/2010 | Birdwell et al. | |
| 2011/0089260 A1 | 4/2011 | Van Roemburg | |
| 2011/0301755 A1 | 12/2011 | Anderson | |
| 2011/0313577 A1 | 12/2011 | Anderson | |
| 2012/0042563 A1 | 2/2012 | Anderson | |
| 2012/0046790 A1 | 2/2012 | Anderson | |
| 2012/0046837 A1 | 2/2012 | Anderson | |
| 2012/0150355 A1 | 6/2012 | Anderson | |

FOREIGN PATENT DOCUMENTS

| | | |
|---|---|---|
| EP | 2243353 A1 | 10/2010 |
| EP | 2423860 A2 | 2/2012 |
| EP | 2426628 A2 | 3/2012 |
| GB | 1597988 | 9/1981 |
| GB | 1603661 | 11/1981 |
| GB | 2462720 A | 2/2010 |
| WO | 0232222 A1 | 4/2002 |
| WO | 2006060854 A1 | 6/2006 |
| WO | 2009059373 A1 | 5/2009 |

OTHER PUBLICATIONS

U.S. Appl. No. 12/427,059, filed Apr. 21, 2009, Anderson.
U.S. Appl. No. 12/427,065, filed Apr. 21, 2009, Anderson.

U.S. Appl. No. 12/427,076, filed Apr. 21, 2009, Anderson.
"The AW-5000-MC", retrieved Feb. 12, 2010 http://www.airwatercorp.com/.
U.S. Appl. No. 12/817,638, filed Jun. 17, 2010, Anderson.
EP Search report for application 10160618.4-2313 dated Jul. 26, 2010.
EP Search report for application 10160613.5-2313 dated Jul. 26, 2010.
European Search Report regarding Application No. 11700005.0-2313, dated Oct. 25, 2011, 8 pages.
Flynn, "A Decision Model for Resource Management Using Rule-Based Utility Functions and Parameter Selection," Dissertation, Ohio State University, ATT 8907223, 1988, 207 pages.
Gwatipedza et al., "A General Monopolistic Competition Economic Model of Horticultural Industry with a Risk of Invasion," U.S. Department of Agriculture, Dec. 6, 2007, 27 pages.
Hardaker et al., "Assessment of the Output of Stochastic Decision Model," Australian Journal of Agricultural Economics, 17(03):170-178, Dec. 1973.
Munoz-Carpena et al., "Automatic Irrigation Based on Soil Moisture for Vegetable Crops," University of Florida, IFAS Extension, ABE356, Jun. 2005, 7 pages.
Perret et al., "Humidification-Dehumidification System in a Greenhouse for Sustainable Crop Production," Ninth International Water Technology Conference, IWTC9 2005, Sharm El-Sheikh, Egypt, Biosystems Engineering, Academic Press, 91(3):849-862, Jul. 2005.
Prasad et al., "A Study on Various Expert Systems in Agriculture," Georgian Electronic Scientific Journal: Computer Science and Telecommunications, 4(11):81-86, Nov. 2006.
Romero, "Risk Programming for Agricultural Resource Allocation: A Multidimensional Risk Approach," Annals of Operations Research, 94:57-68, Jan. 2000.
European Office Action regarding European Application No. 10 160 613.5-2313, dated Mar. 29, 2012, 4 pages.
"Google Goggles (Labs): Overview," http://google.com/support/mobile/ . . . /answer.p . . . , Jun. 1, 2010, 2 pages.
Chesmore, "The Automated Identification of Taxa: Concepts and Applications," In: Automated Taxon Identification Systematics: Theory, Approaches and Applications, McLeod (Ed.), CRC Press. Boca Raton, Florida, pp. 83-100, Jul. 23, 2007.
Eisenberg, "Digital Field Guides Eliminate the Guesswork," The New York Times, May 10, 2009, 2 pages.
El-Helly et al., "Integrating Diagnostic Expert System with Image Processing via Loosely Coupled Technique," INFOS2004, The 2nd International Conference of Informatics and Systems, Cairo, Egypt, Mar. 6-8, 2004, 15 pages.
Fleurat-Lessard et al., "Acoustic Detection and Automatic Identification of Insect Stages Activity in Grain Bulks by Noise Spectra Processing Through Classification Algorithms," 9th International Working Conference on Stored Product Protection, Sao Paulo, Brazil, Oct. 15-18, 2006, 11 pages.
Garcia, "Eavesdropping on Insects in Soil and Plants," U.S. Department of Agriculture, Agriculture Research Service, Jan. 5, 2001, (last modified Jul. 10, 2012), 1 page.
Griepentrog et al., "Autonomous Systems for Plant Protection," In: Precision Crop Protection—The Challenge and Use of Heterogeneity, Oerke et al. (Eds.), Springer Netherlands, New York, New York, pp. 323-333, Aug. 2010.
Muselli et al., "Dew Water Collector for Portable Water in Ajaccio (Corsica Island, France)," Atmospheric Research, 64:297-312, 2002.
Pande et al., "mKRISHI: A Mobile Multimedia agro Advisory System for Remote Rural Farmers," http://www.ics.uci.edu/jain/papers/ACM_mm09_mKRISHI_non_blind.pdf, Apr. 20, 2009, 12 pages.
Pontikakos et al., "Location-Aware System for Olive Fruit Fly Spray Control," Computers and Electronics in Agriculture, 70:355-368, 2010.
Potamitis et al., "On Automatic Bioacoustic Detection of Pests: The Cases of Rhynchophorus ferrugineus and Sitophilus oryzae," Journal of Economic Entomology, 102(4);1681-1690, Aug. 2009.
Schwartz, "Engineer Uses Solar Energy, Wax, and Human Sweat to Fight Malaria," http://cleantechnica.com/2009/01/31/engineer-uses-solar-energy-wax-and-human-sweat-to-fight-malaria/, Jan. 31, 2009, 3 pages.
Sim et al.. "Implementation of an XML-based Multimedia Pests Information System for USN Enviroment," Proceedingd of the 10th ACIS International Conference on Software Engineering, Artificial Intelligences, Networking and Parallel/Distributed Computing, pp 597-601, May 27, 2009.
Tomasini, "Insect (Adult and Larva) Detection Equipment in Stored Grain—EWD Technology," EWD Training Seminar Lite, Saint-Chamas/Carqueiranne, France, May 10-11, 2004, 8 pages.
Woodford, "Connectionist-Based Intelligent Information Systems for Image Analysis and Knowledge Engineering: Applications in Horticulture," Thesis, The University of Otago, Dunedin, New Zealand, pp. 1-9, Dec. 11, 2003.
"Google Googles," YouTube, www.youtube.com/watch?v=Hh, accessed Jul. 19, 2010, 2 pages.
European Search Report regarding European Application No. 11176681.2, dated Jun. 6, 2012, 8 pages.
European Search Report regarding European Application No. 11176689.5, dated Jun. 14, 2012, 10 pages.
European Search Report regarding European Application No. 11176697.8, dated Dec. 22, 2011, 7 pages.

* cited by examiner

SYSTEM AND METHOD FOR PROVIDING PRESCRIBED RESOURCES TO PLANTS

CROSS REFERENCE TO RELATED APPLICATIONS

This application is related to commonly assigned and co-pending U.S. patent application Ser. No. 12/427,043 entitled "System and Method for Managing Resource Use"; U.S. patent application Ser. No. 12/427,059 entitled "Horticultural Knowledge Base for Managing Yards and Gardens"; U.S. patent application Ser. No. 12/427,076 entitled "Resource Use Management"; U.S. patent application Ser. No. 12/427,065 entitled "Robotic Watering Unit" all of which are hereby incorporated by reference.

FIELD OF THE INVENTION

The present invention relates generally to an irrigation control system and, more particularly, to a system and method for watering plants.

BACKGROUND OF THE INVENTION

Horticulture is the industry and science of plant cultivation. Horticulturists work and conduct research in the disciplines of plant propagation and cultivation, crop production, plant breeding and genetic engineering, plant biochemistry, and plant physiology. The work particularly involves fruits, berries, nuts, vegetables, flowers, trees, shrubs, and turf. Horticulturists work to improve crop yield, quality, nutritional value, and resistance to insects, diseases, and environmental stresses.

One aspect of horticultural management is irrigation. Irrigation is typically used to water large, homogeneous areas such as fields, lawns, and gardens. The water is assumed to be available from a single source, such as a well, canal, or municipal water system. Water from municipal water systems are often stressed during times of heat and drought, and watering restrictions are frequently implemented to provide adequate water for higher priority uses. These restrictions may start as odd-even day lawn watering and progress to complete bans on lawn watering, and finally to complete bans on garden watering.

The fields and lawns typically have a single species of plant and water application is based on water sensors, evapotranspiration models, or rules. This type of irrigation system can be inadequate for yards and gardens where numerous species are growing in close proximity, particularly large water users like trees and shrubs in proximity to lesser water users. Trees, shrubs, and structures also provide shade, which impacts evapotranspiration, which is the sum of evaporation and plant transpiration.

SUMMARY

An embodiment of the present invention provides a computer implemented method and system for providing an application of a resource plants. A plurality of per plant prescriptions for a plurality of plants are received and a source is selected to fulfill the plurality of per plant prescriptions to form a selected source. Movement of a mobile utility vehicle is controlled to the selected source, the resource is obtained, and movement of the mobile utility vehicle is controlled to each plant in the plurality of plants. The resource is applied from the mobile utility vehicle to each plant according to the per plant prescription.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present invention when read in conjunction with the accompanying drawings, wherein:

DESCRIPTION OF THE PREFERRED EMBODIMENT

Figure 1:
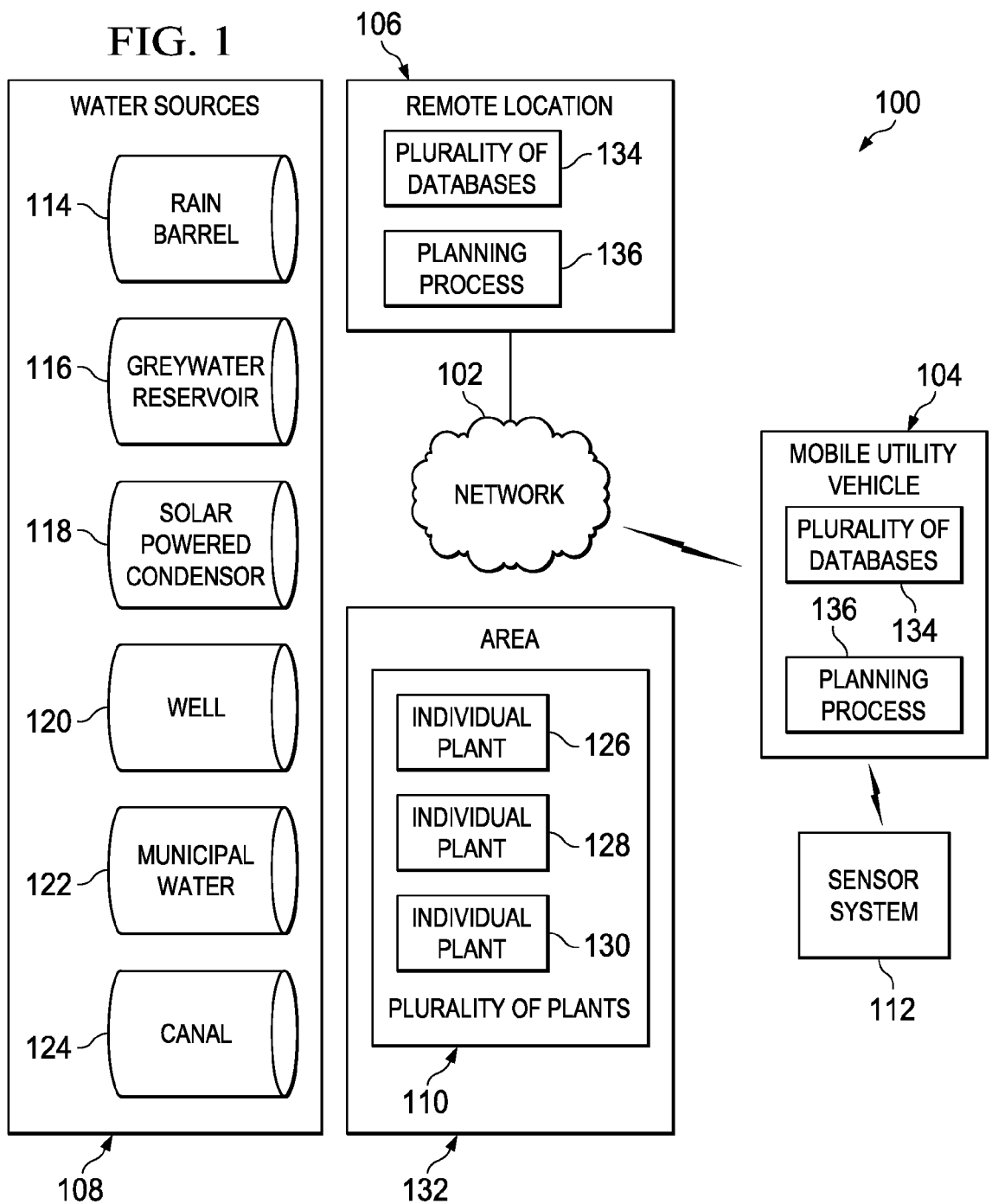
FIG. 1 is a block diagram of a resource use management system in which an illustrative embodiment may be implemented.

FIG. 1 is a block diagram of a resource use management system in which an illustrative embodiment may be implemented. Resource use management system 100 may be implemented in a network of computers in which the illustrative embodiments may be implemented. Resource use management system 100 contains network 102, which is the medium used to provide communications links between various devices and computers connected together within resource use management system 100, such as mobile utility vehicle 104 and remote location 106. Network 102 may include connections, such as wire, wireless communication links, or fiber optic cables.

In the depicted example, mobile utility vehicle 104 connects to network 102 in a wireless configuration while remote location 106 has a hard connection to network 102. In another illustrative embodiment, both mobile utility vehicle 104 and remote location 106 may connect to network 102 in a wireless configuration. Remote location 106 may be, for example, personal computers or network computers. In one illustrative example, remote location 104 provides data, such as boot files, operating system images, and applications, to mobile utility vehicle 104. Resource use management system 100 may also include plurality of databases 134 and planning process 136. Plurality of database 134 may be located at remote location 106, in mobile utility vehicle 104, or distributed across both a remote location and a mobile utility vehicle. Mobile utility vehicle 104 is a client to remote location 106 in this example. Resource use management system 100 may include additional servers, clients, and other devices not shown.

Resource use management system 100 may be used to manage a number of different resources. As used herein, resource refers to, for example, without limitation, water, fertilizer, herbicide, insecticide, fungicide, plant food, nutrients, and/or any other suitable resource for horticultural management. Although the illustrative examples provided herein depict management of water, any resource may be managed using the different illustrative embodiments.

Resource use management system 100 includes water sources 108, plurality of plants 110, and sensor system 112. In this illustrative example, water is the resource managed by resource use management system 100. Water sources 108 is an illustrative example of different sources of water that mobile utility vehicle 104 can draw upon in providing water to plurality of plants 110 according to each plant's need as detected by sensor system 112. Providing water to plurality of plants 110 is an example of a horticultural task executed by mobile utility vehicle 104. Water sources 108 includes rain barrel 114, grey water reservoir 116, solar powered condenser 118, well 120, municipal water 122, and canal 124. Rain barrel 114 is a device for collecting and maintaining harvested rain. In an illustrative example, rain barrel 114 may be a water tank which is used to collect and store rain water runoff, typically from rooftops via rain gutters. In another illustrative example, rain barrel 114 may be an in-ground rainwater tank used for retention of storm water.

Grey water reservoir 116 is a device for collecting non-industrial waste water generated from domestic processes such as dish washing, laundry and bathing. Grey water may comprise waste water generated from all types of residential sanitation equipment except for the toilets. Solar powered condenser 118 condenses water vapor into liquid water using the sunlight which is converted to electricity. In these examples, well 120 is an excavation or structure created in the ground to access water in underground aquifers. In an illustrative embodiment, well 120 may include an electric submersible pump or a mechanical pump used to draw water up to the surface. In another illustrative example, water from well 120 may be drawn up using containers, such as buckets, which are raised mechanically. In one illustrative embodiment, well 120 may include a storage tank with a pressure system. In another illustrative embodiment, well 120 may include a cistern along with a small second pump.

Municipal water 122 is water supplied by the water supply network of a local community, county, and/or municipality. Canal 124 is a water supply channel, or conduit, that is constructed to convey water from one location to another. In an illustrative embodiment, canal 124 may comprise a system of pipes, ditches, canals, tunnels, and other structures used for the conveyance of water.

Plurality of plants 110 includes individual plants 126, 128, and 130. Individual plants 126, 128, and 130 may be homogenous or heterogeneous plant varieties and/or species. In an illustrative embodiment, individual plants 126, 128, and 130 are located in area 132. Area 132 is any location in which a plurality of plants 110 may be located. Area 132 may be, for example, a flowerbed, garden, yard, lawn, landscape, park, field, green, golf course, fairway, rough, orchard, vineyard, or any other area of recreational or amenity land planted with grass and/or other plants. Area 132 may be contiguous or non-contiguous. In one illustrative embodiment, individual plants 126, 128, and 130 may be located in the same portion of area 132. In another illustrative embodiment, individual plants 126, 128, and 130 may be located in separate portions of area 132. In yet another illustrative embodiment, individual plants 126, 128, and 130 may be grouped together in homogenous groupings, or may be grouped together in heterogeneous groupings. Individual plants 126, 128, and 130 may be grouped together in a dense arrangement, or may be spaced apart in any number of arrangements and distances.

Individual plants 126, 128, and 130 are used as an illustrative example of a number of plants that may be present in area 132. Area 132 may contain a number of heterogenous plants and/or a number of homogeneous plants. As used herein, each plant may refer to one or more plants within a category of plants, and/or one or more plants within a common area of location. For example, in an illustrative embodiment, if area 132 is a golf course, individual plant 126 may represent a number of types of plants and/or vegetation on the areas of the golf course referred to as the green, while individual plant 128 may represent a number of types of plants and/or vegetation on the areas of the golf course referred to as the rough.

Sensor system 112 may be a set of sensors used to collect information about the environment around mobile utility vehicle 104 as well as the condition of individual plants 126, 128, and 130, and the condition of area 132 containing individual plants 126, 128, and 130. In these examples, a set refers to one or more items. A set of sensors is one or more sensors in these examples. Sensor system 112 may be distributed across mobile utility vehicle 104 and the area containing plurality of plants 110.

The illustration of resource use management system 100 in FIG. 1 is intended as an example, and not as an architectural limitation to the manner in which the different illustrative embodiments may be implemented. Other components may be used in addition to or in place of the ones illustrated for resource use management system 100 in other illustrative embodiments. For example, in some illustrative embodiments a set of mobile utility vehicles may be used in addition to mobile utility vehicle 104. In another illustrative example, water sources 108 may contain additional resources such as, for example, without limitation, fertilizer, herbicide, insecticide, fungicide, plant food, nutrients, and other substances used in plant care and maintenance. As used herein, water refers to water and/or other resources that may be applied to plants, such as individual plants 126, 128, and 130. Other resources may be, for example, without limitation, fertilizer, herbicide, insecticide, fungicide, plant food, nutrients, and the like.

In yet another illustrative embodiment, resource use management system 100 may represent a system for addressing horticultural tasks other than water management. A horticultural task may include, without limitation, watering, pruning, cultivating, and winterizing a number of plants. As used herein, a number refers to one or more plants.

Figure 2:
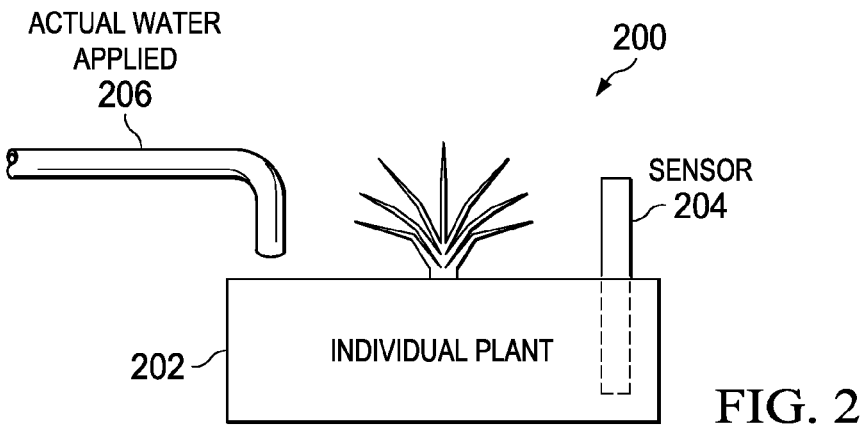
FIG. 2 is a block diagram of water use in accordance with an illustrative embodiment.

With reference now to FIG. 2, a block diagram of water use is depicted in accordance with an illustrative embodiment. Water use 200 is an example of mobile utility vehicle 104 in FIG. 1 obtaining water from water sources 108 and applying the water to plurality of plants 110 using information collected by sensor system 112 in FIG. 1.

Individual plant 202 is an example of individual plants 126, 128, and 130 in FIG. 1. Sensor 204 is a soil moisture sensor located within the same portion of the area in which individual plant 202 is located. Sensor 204 measures the water content in soil around individual plant 202. Actual water applied 206 is water applied by mobile utility vehicle 104 in FIG. 1.

Figure 3:
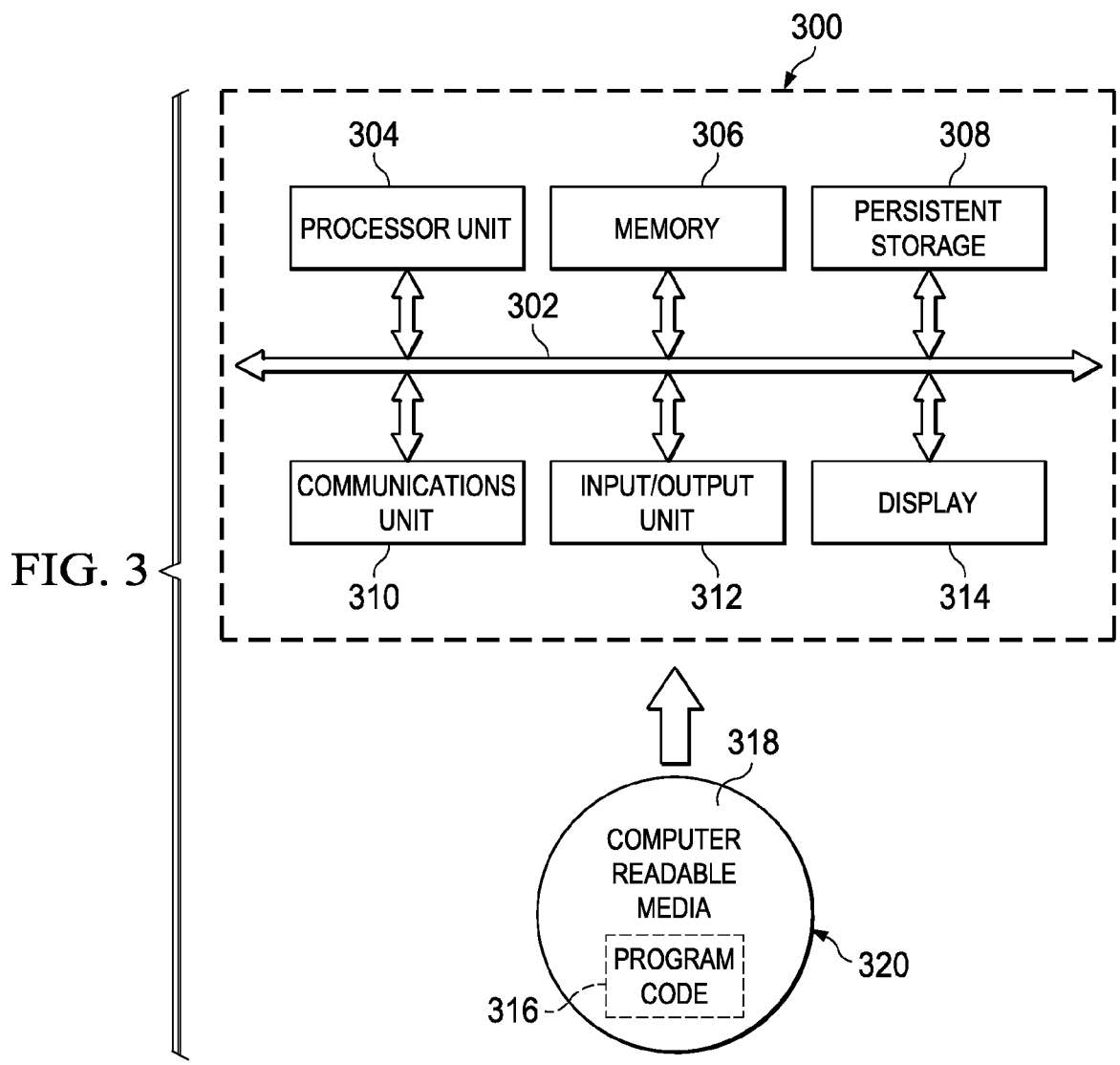
FIG. 3 is a block diagram of a data processing system in accordance with an illustrative embodiment.

With reference now to FIG. 3, a block diagram of a data processing system is depicted in which illustrative embodiments may be implemented. Data processing system 300 is an example of a computer, such as remote location 106 or mobile utility vehicle 104 in FIG. 1, in which computer usable program code or instructions implementing the processes may be located for the illustrative embodiments. In this illustrative example, data processing system 300 includes communications fabric 302, which provides communications between processor unit 304, memory 306, persistent storage 308, communications unit 310, input/output (I/O) unit 312, and display 314.

Processor unit 304 serves to execute instructions for software that may be loaded into memory 306. Processor unit 304 may be a set of one or more processors or may be a multi-processor core, depending on the particular implementation. Further, processor unit 304 may be implemented using one or more heterogeneous processor systems in which a main processor is present with secondary processors on a single chip. As another illustrative example, processor unit 304 may be a symmetric multi-processor system containing multiple processors of the same type.

Memory 306, in these examples, may be, for example, a random access memory or any other suitable volatile or non-volatile storage device. Persistent storage 308 may take various forms depending on the particular implementation. For example, persistent storage 308 may contain one or more components or devices. For example, persistent storage 308 may be a hard drive, a flash memory, a rewritable optical disk, a rewritable magnetic tape, or some combination of the above. The media used by persistent storage 308 also may be removable. For example, a removable hard drive may be used for persistent storage 308.

Communications unit 310, in these examples, provides for communications with other data processing systems or devices. In these examples, communications unit 310 is a network interface card. Communications unit 310 may provide communications through the use of either or both physical and wireless communications links.

Input/output unit 312 allows for input and output of data with other devices that may be connected to data processing system 300. For example, input/output unit 312 may provide a connection for user input through a keyboard and mouse. Further, input/output unit 312 may send output to a printer. Display 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306. These instructions are referred to as program code, computer usable program code, or computer readable program code that may be read and executed by a processor in processor unit 304. The program code in the different embodiments may be embodied on different physical or tangible computer readable media, such as memory 306 or persistent storage 308.

Program code 316 is located in a functional form on computer readable media 318 that is selectively removable and may be loaded onto or transferred to data processing system 300 for execution by processor unit 304. Program code 316 and computer readable media 318 form computer program product 320 in these examples. In one example, computer readable media 318 may be in a tangible form, such as, for example, an optical or magnetic disc that is inserted or placed into a drive or other device that is part of persistent storage 308 for transfer onto a storage device, such as a hard drive that is part of persistent storage 308. In a tangible form, computer readable media 318 also may take the form of a persistent storage, such as a hard drive, a thumb drive, or a flash memory that is connected to data processing system 300. The tangible form of computer readable media 318 is also referred to as computer recordable storage media. In some instances, computer recordable media 318 may not be removable.

Alternatively, program code 316 may be transferred to data processing system 300 from computer readable media 318 through a communications link to communications unit 310 and/or through a connection to input/output unit 312. The communications link and/or the connection may be physical or wireless in the illustrative examples. The computer readable media also may take the form of non-tangible media, such as communications links or wireless transmissions containing the program code.

The different components illustrated for data processing system 300 are not meant to provide architectural limitations to the manner in which different embodiments may be implemented. The different illustrative embodiments may be implemented in a data processing system including components in addition to or in place of those illustrated for data processing system 300. Other components shown in FIG. 3 can be varied from the illustrative examples shown.

As one example, a storage device in data processing system 300 is any hardware apparatus that may store data. Memory 306, persistent storage 308, and computer readable media 318 are examples of storage devices in a tangible form.

In another example, a bus system may be used to implement communications fabric 302 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 306 or a cache, such as found in an interface and memory controller hub that may be present in communications fabric 302.

Figure 4:
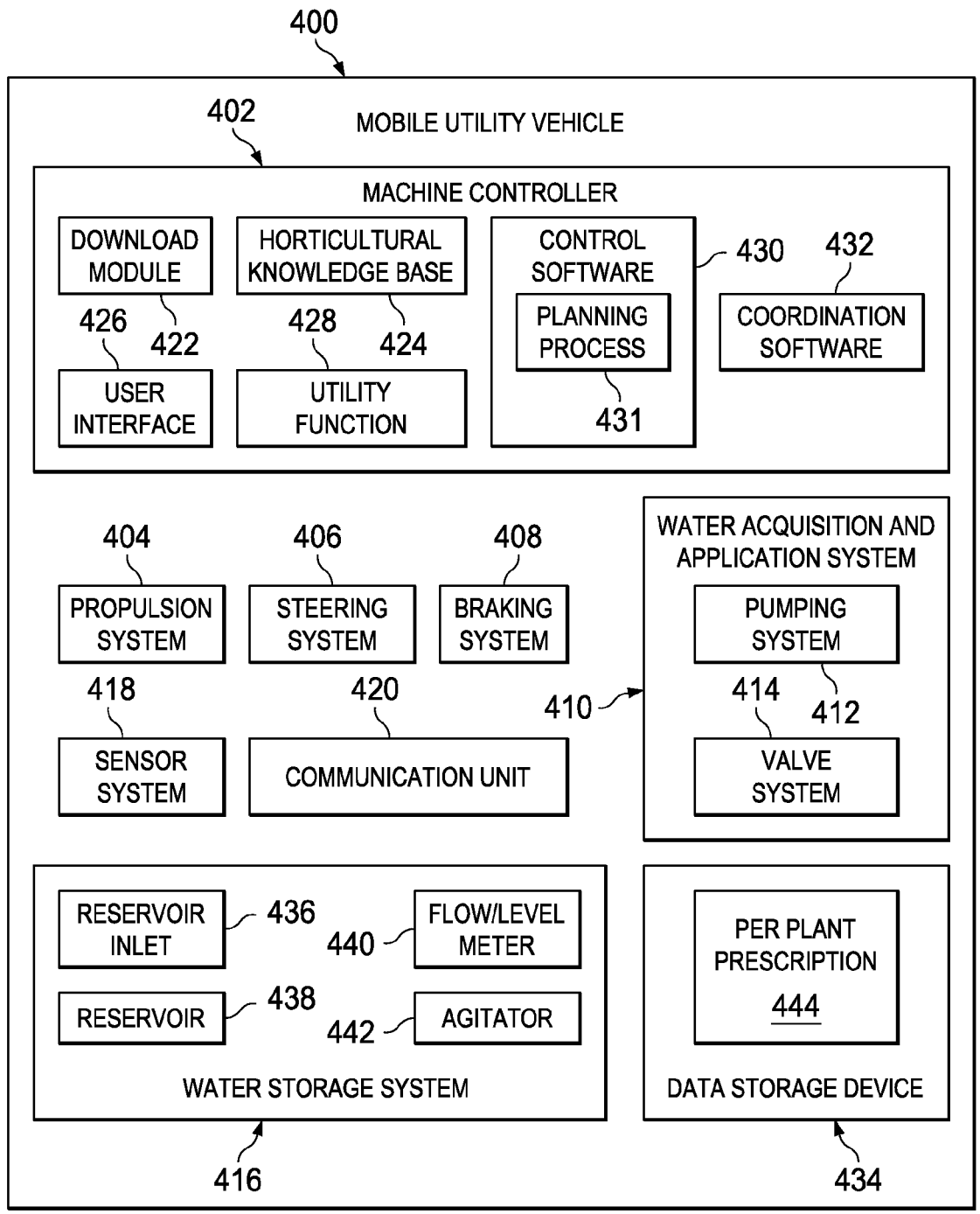
FIG. 4 is a block diagram of a mobile utility vehicle in accordance with an illustrative embodiment.

With reference now to FIG. 4, a block diagram of a mobile utility vehicle is depicted in accordance with an illustrative embodiment. Mobile utility vehicle 400 is an example of one implementation for mobile utility vehicle 104 in FIG. 1.

As illustrated, mobile utility vehicle 400 includes machine controller 402, propulsion system 404, steering system 406, braking system 408, water acquisition and application system 410, water storage system 416, sensor system 418, communications unit 420, and data storage device 434.

Machine controller 402 includes download module 422, horticultural knowledge base 424, user interface 426, utility function 428, control software 430, and coordination software 432. Machine controller 402 may be, for example, a data processing system, such as data processing system 300 in FIG. 3, or some other device that may execute processes to control movement of mobile utility vehicle 400. Machine controller 402 may be, for example, a computer, an application integrated specific circuit, and/or some other suitable device. Different types of devices and systems may be used to provide redundancy and fault tolerance. Machine controller 402 may be connected to the different components and systems of mobile utility vehicle 400, such as propulsion system 404, steering system 406, braking system 408, water acquisition and application system 410, water storage system 416, sensor system 418, communications unit 420, and data storage device 434. As used herein, connected to refers to the machine controller being in communication with the different components and systems of mobile utility vehicle 400 in a manner such that information can be exchanged between machine controller 402 and the different components and systems of mobile utility vehicle 400. In an illustrative example, information may be anything can be sent between the components and systems of mobile utility vehicle 400 to operate mobile utility vehicle 400. Examples of information include, but are not limited to, data, commands, programs, and/or any other suitable information.

Control software 430 may include software such as planning process 431. Planning process 431 may be used by machine controller 402 to generate plans for execution of horticultural tasks using horticultural knowledge base 424.

Machine controller 402 may execute processes using control software 430 to control propulsion system 404, steering system 406, and braking system 408 to control movement of mobile utility vehicle 400. Machine controller 402 may also use coordination software 432 to coordinate the movements of each mobile utility vehicle receiving commands from machine controller 402. Machine controller 402 may execute processes using control software 430 to control water acquisition and application system 410, water storage system 416, and sensor system 418 to control water acquisition and application by mobile utility vehicle 400. Machine controller 402 may execute processes using horticultural knowledge base 424 and/or utility function 428 to control tasks being performed by mobile utility vehicle 400, such as water application by water acquisition and application system 410, for example. Machine controller 402 may send various commands to these components to operate the mobile utility vehicle in different modes of operation. These commands may take various forms depending on the implementation. For example, the commands may be analog electrical signals in which a voltage and/or current change is used to control these systems. In other implementations, the commands may take the form of data sent to the systems to initiate the desired actions.

Machine controller 402 may be a single processing unit, two processing units, or distributed across a number of processing units. As used herein, a number refers to one or more processing units.

Download module 422 provides for updates of horticultural knowledge base 424 through a control system or remote location, such as remote location 106 in FIG. 1. Download module 422 may also provide mobile utility vehicle 400 access to per plant prescriptions, and other information located at a remote location, such as remote location 106 in FIG. 1.

Horticultural knowledge base 424 contains information about the operating environment, such as, for example, a fixed map showing the landscape, structures, tree locations, flowerbed locations, individual plant locations, and other static object locations. Horticultural knowledge base 424 may also contain information, such as, without limitation, plant species and varieties located in the operating environment, information about the water needs, growth stages, and life cycles of the plant species and varieties located in the operating environment, current weather for the operating environment, weather history for the operating environment, specific environmental features of the operating environment that affect mobile utility vehicle 400, and/or any other suitable information for management and execution of horticultural tasks. The information in horticultural knowledge base 424 may be used to perform classification and plan actions for horticultural tasks. Horticultural knowledge base 424 may be located entirely in mobile utility vehicle 400 or parts or all of horticultural knowledge base 424 may be located in a remote location, such as remote location 106 in FIG. 1, which is accessed by mobile utility vehicle 400.

User interface 426 may be, in one illustrative embodiment, presented on a display monitor mounted on a side of mobile utility vehicle 400 and viewable by an operator. User interface 426 may display sensor data from the environment surrounding mobile utility vehicle 400, as well as messages, alerts, and queries for the operator. In other illustrative embodiments, user interface 426 may be presented on a remote display held by an operator or located in a remote location, such as remote location 106 in FIG. 1.

Utility function 428 operates with constraints to maximize the utility of water use in the context of the whole growing season for the plurality of plants, such as plurality of plants 110 in FIG. 1. The exact utility function of utility function 428 may be tailored by an operator, such as a garden administrator for example, via user interface 426. In one illustrative embodiment, utility function 428 operates to maximize benefits and minimize costs according to a number of constraints. The number of constraints may be the current water rules for a location. Current water rules may include, for example, water shortage information, water restrictions imposed upon a certain location, and/or the amount of water currently accessible to mobile utility vehicle 400 from the plurality of available water sources, such as water sources 108 in FIG. 1.

Figure 7:
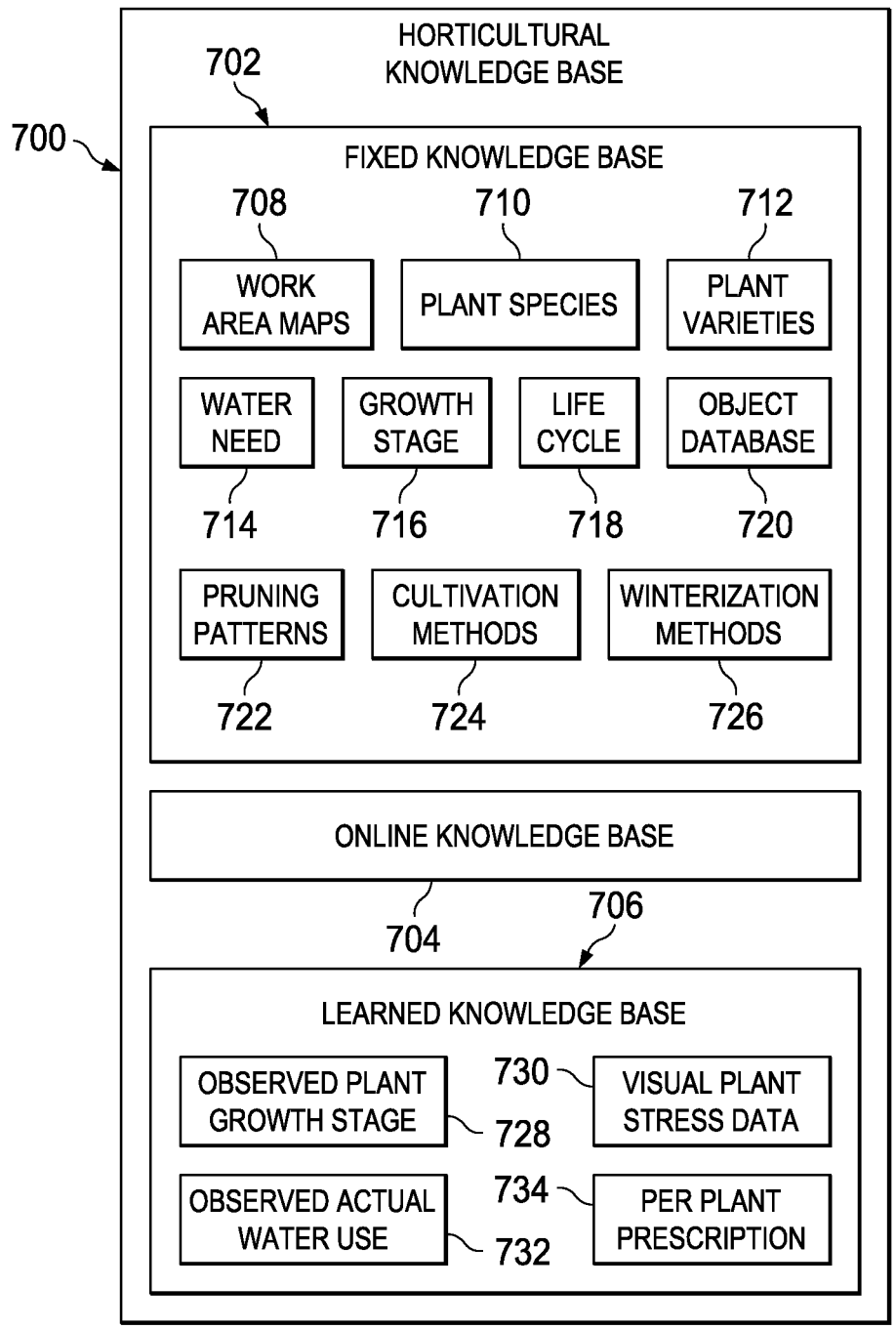
FIG. 7 is a block diagram of a horticultural knowledge base in accordance with an illustrative embodiment.

In an illustrative embodiment, for example, a garden administrator may employ utility function 428 to consider the following illustrative subset of information received from horticulture knowledge base 700 in FIG. 7 for plurality of plants 110 in FIG. 1:

| Plant | Type | Growth Stage | Minimum | Optimum | Note |
|---|---|---|---|---|---|
| 126 | annual | past flowering | 100 ml | 200 ml | none |
| 128 | perennial | pre flowering | 50 ml | 150 ml | show |
| 130 | annual | pre flowering | 75 ml | 150 ml | none |

In this illustrative subset of information, the optimum amount of water to apply to plurality of plants 110 is 500 milliliters (ml). Actual application at the current time may be constrained to only 250 ml. The constraint may be due to, for example, water shortage or drought restrictions put in place by a city or township, for example. The garden administrator could prioritize water as follows: (1) plants to be featured in an upcoming show, (2) perennials, (3) annuals in pre-flowering stage, and (4) annuals in post-flowering stage, kept only as greenery, that may be given 0 ml (i.e. left to die).

Based on this illustrative prioritization, individual plant 128 in FIG. 1 is given the highest priority and could be given the optimum 150 ml of water. Individual plant 130 in FIG. 1 could then be given 100 ml of water, and individual plant 126 in FIG. 1 would not be given any water. If a plant, such as individual plant 126 in FIG. 1, is to be abandoned, a work order may be generated to have it removed so it does not draw any additional water from the soil. If water is ample, it can be left and watered to provide aesthetically pleasing greenery.

In these examples, propulsion system 404 may propel or move mobile utility vehicle 400 in response to commands from machine controller 402. Propulsion system 404 may maintain or increase the speed at which a mobile utility vehicle moves in response to instructions received from machine controller 402. Propulsion system 404 may be an electrically controlled propulsion system. Propulsion system 404 may be, for example, an internal combustion engine, an internal combustion engine/electric hybrid system, an electric engine, or some other suitable propulsion system.

Steering system 406 may control the direction or steering of mobile utility vehicle 400 in response to commands received from machine controller 402. Steering system 406 may be, for example, an electrically controlled hydraulic steering system, an electrically driven rack and pinion steering system, an Ackerman steering system, a skid-steer steering system, a differential steering system, or some other suitable steering system.

Braking system 408 may slow down and/or stop mobile utility vehicle 400 in response to commands from machine controller 402. Braking system 408 may be an electrically controlled steering system. This braking system may be, for example, a hydraulic braking system, a friction braking system, or some other suitable braking system that may be electrically controlled.

Water acquisition and application system 410 is an example of one type of system that may be located on mobile utility vehicle 400 for executing a horticultural task, such as watering. Water acquisition and application system 410 enables mobile utility vehicle 400 to acquire a resource, such as water, from a plurality of water sources, such as water sources 108 in FIG. 1, for storage in water storage system 416. Water storage system 416 is an illustrative example of a type of resource storage system used by mobile utility vehicle 400. Water acquisition and application system 410 also enables mobile utility vehicle 400 to apply a resource, such as water, to a plurality of individual plants, such as individual plants 126, 128, and 130 in FIG. 1. Water acquisition and application system 410 includes pumping system 412 and valve system 414.

Valve system 414 may include a number of valves for starting and stopping the flow of a resource. Valve system 414 may be used in conjunction with gravity feed to acquire a resource from resource sources that are above the level of reservoir 438 in water storage system 416. Pumping system 412 may be used to draw a resource from resource sources that are below the level of reservoir 438 into water storage system 416.

In an illustrative example, while gravity feed could be used to water plants, this requires that the water level be above the outlet level. This may not be suitable for small mobile utility vehicles such as robots, which need to water plants in large pots or pots which are placed above the surrounding area on a pedestal. For plants that are at a level below reservoir 438 of mobile utility vehicle 400, valve system 414 is used to allow a resource, such as water, to be pulled by gravity and dispersed. For plants that are at a level above reservoir 438, pumping system 412 would allow a resource, such as water, to be transferred from water storage system 416 to a plurality of plants, such as, for example, one of plurality of plants 110 in FIG. 1. As used herein, a number of plants is one or more plants. The amount of a resource, such as water, is specified by a per plant prescription. The actual resource applied may be estimated from pump activity or measured using a fluid flow sensor, such as flow/level meter 440 in water storage system 416.

Water storage system 416 includes reservoir inlet 436, reservoir 438, flow/level meter 440, and agitator 442. Reservoir inlet 436 is an opening or conduit for allowing a resource to be added to reservoir 438. Reservoir 438 is a vessel used to hold a resource in reserve. In an illustrative embodiment, water storage system 416 may have a number of reservoirs. As used herein, a number refers to one or more reservoirs. Flow/level meter 440 monitors the amount of a resource in reservoir 438 and the amount of a resource applied at a particular location.

In an illustrative embodiment, flow/level meter 440 may be, for example, a float in reservoir 438. The vertical position of the float may be representative of the amount of water in reservoir 438. In an illustrative embodiment, the float may be a sensor that tracks the change of water level over time, and transmits the sensor data to a processing system, such as machine controller 402. In another illustrative embodiment, flow/level meter 440 may be a device for measuring the flow rate of water as water passes from reservoir 438 through water acquisition and application system 410. For example, a pinwheel sensor device may be used to measure the amount of water flowing out of reservoir 438. The pinwheel sensor device may spin as water flows over the device, and the rate of the spin may indicate the amount of water flowing over the device. The sensor data may be transmitted to a data processing system, such as machine controller 402. In another illustrative example, if the initial reservoir level is known, the sensor data for the flow rate over a pinwheel device may be used to calculate the remaining level in the reservoir.

Agitator 442 may be used to mix two or more resources together to achieve a uniform consistency in reservoir 438. Resources may be, for example, without limitation, water, fertilizer, herbicide, insecticide, fungicide, plant food, nutrients, and the like.

Sensor system 418 is a high integrity perception system and may be a set of sensors used to collect information about the environment around a mobile utility vehicle. In these examples, the information is sent to machine controller 402 to provide data in identifying how mobile utility vehicle 400 should manage water use, specifically providing data about the plurality of plants and current conditions in the operating environment. In these examples, a set refers to one or more items. A set of sensors is one or more sensors in these examples.

Communication unit 420 is a high integrity communications system and may provide multiple redundant communications links and channels to machine controller 402 to receive information. The communication links and channels may be heterogeneous and/or homogeneous redundant components that provide fail-safe communication. This information includes, for example, data, commands, and/or instructions.

Communication unit 420 may take various forms. For example, communication unit 420 may include a wireless communications system, such as a cellular phone system, a Wi-Fi wireless system, a Bluetooth wireless system, and/or some other suitable wireless communications system. Further, communication unit 420 also may include a communications port, such as, for example, a universal serial bus port, a serial interface, a parallel port interface, a network interface, and/or some other suitable port to provide a physical communications link. Communication unit 420 may be used to communicate with a remote location, such as remote location 106 in FIG. 1, or an operator.

Data storage device 434 is one example of persistent storage 308 in FIG. 3. Data storage device 434 includes per plant prescription 444. Per plant prescription 444 may be obtained using horticultural knowledge base 424, or may be received from a remote location via download module 422.

The illustration of mobile utility vehicle 400 in FIG. 4 is not meant to imply physical or architectural limitations on the manner in which different advantageous embodiments may be implemented. Other components in addition or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments an agitator may be unnecessary for water storage system 416. In some other advantageous embodiments, multiple reservoirs may be found within water storage system 416, where each reservoir contains a different resource. As used herein, water refers to water and/or other resources that may be applied to plants, such as individual plants 126, 128, and 130 in FIG. 1. Other resources may be, for example, without limitation, fertilizer, herbicide, insecticide, fungicide, plant food, nutrients, and the like.

In another advantageous embodiment, mobile utility vehicle 400 may contain additional systems in place of or in addition to the systems depicted. For example, other systems may include, without limitation, pruning systems, cultivation systems, planting systems, and/or any other suitable system for executing horticultural tasks. Mobile utility vehicle 400 may be a general purpose mobile utility vehicle or a dedicated mobile utility vehicle. A general purpose mobile utility vehicle may have one or more interchangeable systems. A dedicated mobile utility vehicle may have one or more fixed systems.

Figure 5:
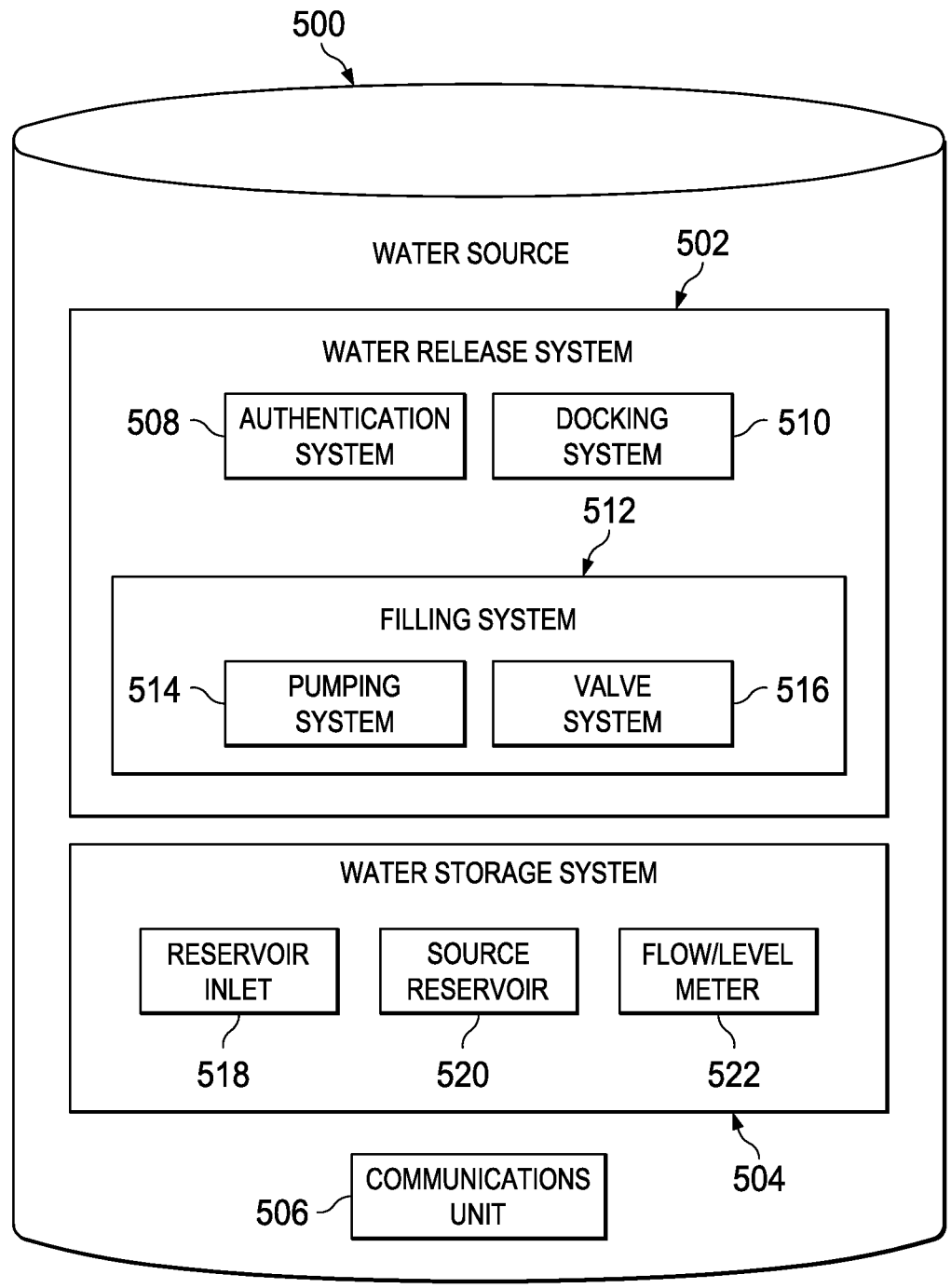
FIG. 5 is a block diagram of a water source in accordance with an illustrative embodiment.

With reference now to FIG. 5, a block diagram of a water source is depicted in accordance with an illustrative embodiment. Water source 500 is an example of one of water sources 108 in FIG. 1.

Water source 500 includes water release system 502, water storage system 504, and communications unit 506. Water release system 502 includes authentication system 508, docking system 510, and filling system 512. Authentication system 508 receives identification information from a mobile utility vehicle, such as mobile utility vehicle 400 in FIG. 4, and determines whether the mobile utility vehicle is authorized to draw water from water source 500. For example, in an illustrative embodiment, authentication system 508 may include a radio frequency identification reader that detects a radio frequency identification tag on a mobile utility vehicle.

Docking system 510 allows a mobile utility vehicle to achieve the correct position for the transfer of water between water source 500 and the mobile utility vehicle.

Filling system 512 includes pumping system 514 and valve system 516. Pumping system 514 may be used to draw water from water source 500 in order to send the water into the mobile utility vehicle. Valve system 516 may include a number of valves for starting and stopping the flow of water from water source 500 to a mobile utility vehicle. Valve system 516 may be used in conjunction with gravity feed to send water from water source 500 to a mobile utility vehicle that is below the level of water source 500.

Water storage system 504 includes reservoir inlet 518, source reservoir 520, and flow/level meter 522. Reservoir inlet 518 is an opening or conduit for allowing water to be added to source reservoir 520. Source reservoir 520 is a vessel used to hold water in reserve. In an illustrative embodiment, source reservoir may be a barrel, condenser, well, canal, lake, river, stream, creek, pond, and the like. Flow/level meter 522 monitors the amount of water in source reservoir 520 and the amount of water transferred to a particular mobile utility vehicle. In an illustrative embodiment, flow/level meter 522 may be, for example, a float in source reservoir 520, a device for measuring the flow rate of water as water passes from source reservoir 520 to a mobile utility vehicle, or a combination.

Communications unit 506 may optionally be used to receive identification information from a mobile utility vehicle and transmit water source data to a remote location, such as remote location 106 in FIG. 1, or an operator. Communications unit 506 may take various forms. For example, communication unit 506 may include a wireless communications system, such as a cellular phone system, a Wi-Fi wireless system, a Bluetooth wireless system, and/or some other suitable wireless communications system. Further, communication unit 506 also may include a communications port, such as, for example, a universal serial bus port, a serial interface, a parallel port interface, a network interface, and/or some other suitable port to provide a physical communications link.

The illustration of water source 500 in FIG. 5 is not meant to imply physical or architectural limitations on the manner in which different advantageous embodiments may be implemented. Other components in addition or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments, authentication system 508 and communications unit 506 may be integrated as one system. In some other advantageous embodiments, filling system 512 may contain only one system, or another system in addition to pumping system 514 and valve system 516.

Figure 6:
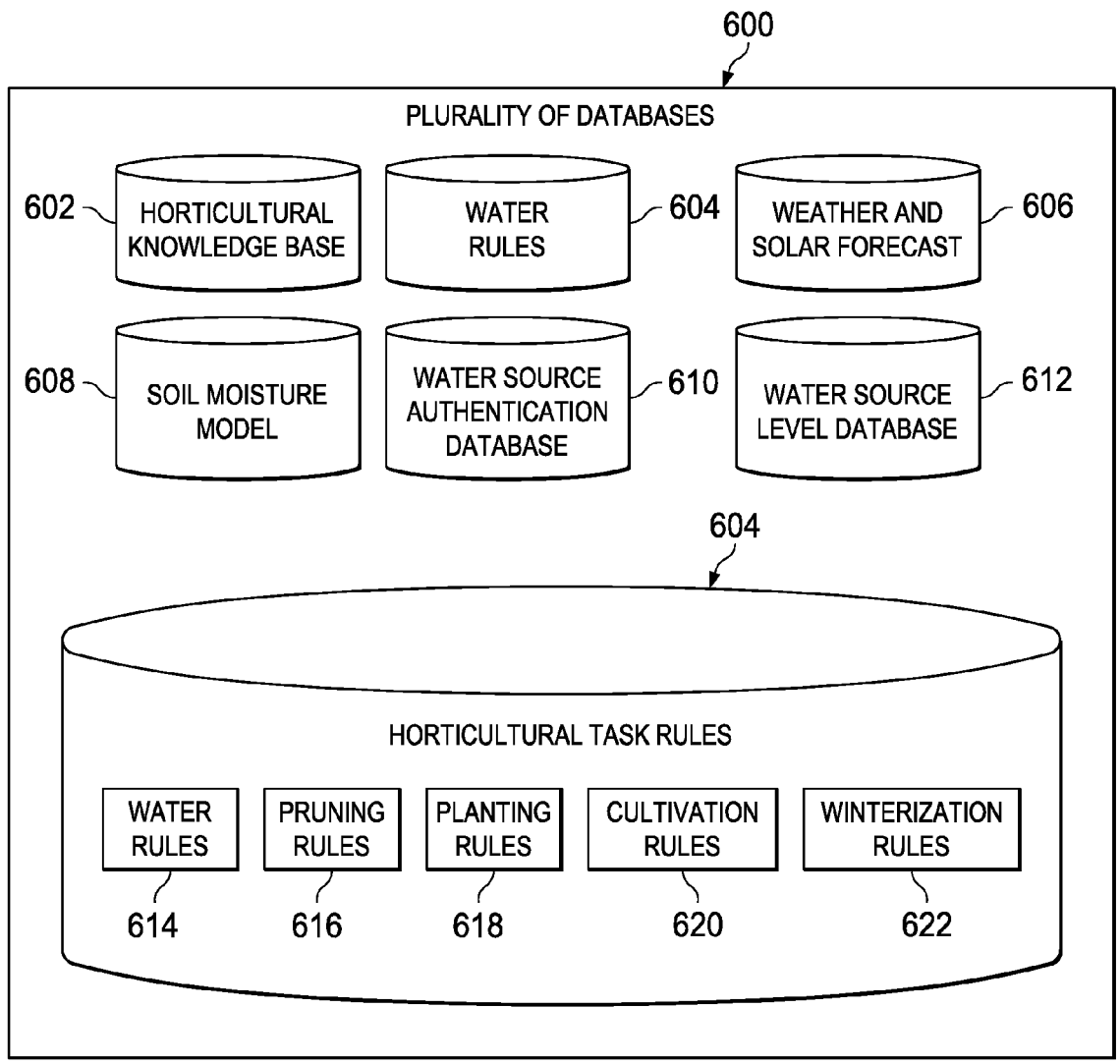
FIG. 6 is a block diagram of a plurality of databases in accordance with an illustrative embodiment.

With reference now to FIG. 6, a block diagram of a plurality of databases is depicted in accordance with an illustrative embodiment. Plurality of databases 600 may be located at a remote location, such as remote location 106 in FIG. 1, in a mobile utility vehicle, such as mobile utility vehicle 104 in FIG. 1 and mobile utility vehicle 400 in FIG. 4, or distributed across both a remote location and a mobile utility vehicle.

Plurality of databases 600 includes horticultural knowledge base 602, horticultural task rules 604, weather and solar forecast 606, soil moisture model 608, water source authentication database 610, and water source level database 612. Horticultural knowledge base 602 contains information about the operating environment, such as, for example, a fixed map showing the landscape, structures, tree locations, flowerbed locations, individual plant locations, and other static object locations. Horticultural knowledge base 602 may also contain information, such as, without limitation, plant species and varieties located in the operating environment, information about the water needs, growth stages, and life cycles of the plant species and varieties located in the operating environment, current weather for the operating environment, weather history for the operating environment, specific environmental features of the operating environment that affect a mobile utility vehicle, such as mobile utility vehicle 400 in FIG. 4, pruning patterns, planting depth, seed orientation, cultivation methods, winterization methods, and/or any other suitable horticultural information.

The information in horticultural knowledge base 602 may be used to perform classification and plan actions. Horticultural knowledge base 602 may be located entirely in a mobile utility vehicle, such as mobile utility vehicle 400 in FIG. 4, or parts or all of horticultural knowledge base 602 may be located in a remote location, such as remote location 106 in FIG. 1, which is accessed by a mobile utility vehicle.

Horticultural task rules 604 may include, without limitation, water rules 614, pruning rules 616, planting rules 618, cultivation rules 620, and winterization rules 622. Water rules 614 may include current water rules for the operating environment of a mobile utility vehicle. Water rules 614 may include water shortage information, water restrictions imposed upon an operating environment, or the amount of water currently accessible to a mobile utility vehicle, such as mobile utility vehicle 104 in FIG. 1, from a plurality of available water sources, such as water sources 108 in FIG. 1.

Pruning rules 616 may include rules about what time of year a particular plant should be pruned, based on the plant variety, species, growth stage, and/or life cycle of the particular plant. Pruning may refer to the removal of diseased, non-productive, or otherwise unwanted portions from a plant. Pruning may be used to shape a plant by controlling or directing plant growth, maintain the health of the plant, or to increase the yield or quality of flowers and fruits.

For example, pruning small branches may be done at any time of the year. In another illustrative example, pruning large branches, with more than five to ten percent of the plant's crown, may be done during dormancy in winter or in mid summer just after flowering. In this example, pruning rules 616 may take into account the type of plant being pruned, and further specify that one plant species may experience harm from winter frost if pruned during dormancy and should be pruned mid summer, while another plant species is hardy enough to withstand pruning during winter. Some plant species, such as a magnolia for example, are better pruned in summer or at the onset of dormancy because the plant species are slow to callous over after pruning. Woody plants that flower early in the season, such as apples, azaleas, and lilacs, for example, should be pruned right after flowering because later pruning may sacrifice flowers in the subsequent season.

Planting rules 618 may include rules on when to plant seeds, seed treatment prior to planting, seed depth for planting, seed orientation for planting, and/or any other suitable planting rules for a particular plant based upon the plant variety, plant species, and/or life cycle of the particular plant. For example, some species of plant may require cold treatment in order to germinate and should be planted during winter in order to germinate properly in the spring. In another illustrative example, some species of plant may germinate quickly and need a temperate environment to flourish, and therefore need to be planted in the spring.

Rules for when to plant seeds may refer to which season is best for planting. Rules for seed treatment prior to planting may include rules, such as, without limitation, seed scarification, stratification, seed soaking, seed cleaning, seed germination, and/or any other suitable seed treatment. Seed orientation may refer to the position of a seed in the soil, such as, for example, positioned with the roots down.

Cultivation rules 620 may include rules for when to cultivate a plant based on the plant variety, species, growth stage, and/or life cycle of the particular plant. Cultivation may refer to tasks such as, without limitation, tilling or working the soil, removing weeds, harvesting plants, and/or any other suitable cultivation task.

Winterization rules 622 may include rules for when to winterize a particular plant based on the plant variety, species, growth stage, and/or life cycle of the particular plant. For example, certain varieties of perennials may need winterization in order to survive until the next season.

Weather and solar forecast 606 may contain information about the current operating conditions in an operating environment. Current operating conditions may include factors such as, without limitation, recent rainfall, current rainfall, expected rainfall, drought, rain shortage, wind, cloud cover, shade, direct sunlight, current temperature, and the like.

Soil moisture model 608 is a basic model of the ideal soil moisture conditions for an individual plant, such as individual plants 126, 128, and 130 in FIG. 1. Soil moisture model 608 may be adjusted according to in situ measurements of the type of soil and/or topography of the operating environment. The topography may include features of the operating environment such as, without limitation, a slope or hill of the operating environment. In these examples, the topography may affect the moisture retention of soil in the operating environment.

Water source authentication database 610 may contain information for identifying and authenticating authorized mobile utility vehicles. For example, in an illustrative embodiment, water source authentication database 610 may contain information about the particular water sources a particular mobile utility vehicle is authorized to draw water from, or specific dates and times at which a particular mobile utility vehicle may draw water from a particular water source. Water source authentication database 610 may be accessed by a water source, such as water source 500 in FIG. 5 using an authentication system, such as authentication system 508 in FIG. 5. Water source authentication database 610 may also be accessed by a mobile utility vehicle, such as mobile utility vehicle 400 in FIG. 4 using download module 420 to acquire authentication codes for a particular water source, for example.

Water source level database 612 contains information about the current water levels of different water sources, such as water sources 108 in FIG. 1. In an illustrative embodiment, a water source, such as water source 500 in FIG. 5, may transmit source reservoir level information to water source level database 612. A mobile utility vehicle, such as mobile utility vehicle 400 in FIG. 4 may access water source level database 612 when determining which water source to access in order to full a per plant prescription.

The illustration of plurality of databases 600 in FIG. 6 is not meant to imply physical or architectural limitations on the manner in which different advantageous embodiments may be implemented. Other components in addition or in place of the ones illustrated may be used. Some components may be unnecessary in some advantageous embodiments. Also, the blocks are presented to illustrate some functional components and combined and/or divided into different blocks when implemented in hardware and/or software. For example, in some advantageous embodiments plurality of databases 600 may contain additional databases, or fewer databases.

With reference now to FIG. 7, a block diagram of a horticultural knowledge base is depicted in accordance with an illustrative embodiment. Horticultural knowledge base 700 is an example of a knowledge base component of a machine controller, such as horticultural knowledge base 424 of mobile utility vehicle 400 in FIG. 4. For example, horticultural knowledge base 700 may be, without limitation, a component of a navigation system, an autonomous machine controller, a semi-autonomous machine controller, or may be used to make horticultural management decisions regarding operating environment activities and coordination activities.

Horticultural knowledge base 700 includes fixed knowledge base 702, online knowledge based 704, and learned knowledge base 706.

Fixed knowledge base 702 contains static information about the operating environment of a mobile utility vehicle. Fixed knowledge base 702 includes work area maps 708, plant species 710, plant varieties 712, water needs 714, growth stages 716, life cycles 718, object database 720, pruning patterns 722, cultivation methods 724, and winterization methods 726. Work area maps 708 contains information about the operating environment of a mobile utility vehicle such as, without limitation, a fixed map showing the landscape, structures, tree locations, flowerbed locations, individual plant locations, and other static object locations.

Plant species 710 contains information about the characteristics of various plant species. For example, characteristics of various plant species may be, without limitation, trunk, bark, branching system, stem size, leaf pattern, budding, non-budding, color, growth pattern, preferred sunlight, preferred soil moisture, preferred soil pH, and the like. Plant varieties 712 contain information about the characteristics of the different plant varieties or cultivars of the various plant species found in plant species 710. For example, characteristics of different plant varieties or cultivars of the various plant species may be, without limitation, color, size, growth pattern, budding pattern, preferred sunlight, preferred soil moisture, preferred soil pH, and the like. A cultivar is a cultivated plant that has been selected and given a unique name because of its decorative or useful characteristics. A cultivar is usually distinct from similar plants and when propagated it retains those characteristics.

In an illustrative embodiment, some examples of various characteristics of preferred soil moisture may be, without limitation, more water than average rainfall for the year, more water during growth stage, no water during dormancy period, well-drained soil, and the like. In another illustrative embodiment, some examples of various characteristics of color and size may be, without limitation, green leaves with white margins, green leaves with irregular wide light yellow margins, chartreuse to gold leaves with dark green margins, dark blue leaves with yellow shades, large leaves chartreuse to gold, green leaves with wide gold centers and white streaks between, and the like.

Water needs 714 contains information about the typical water needs associated with each plant species and plant variety or cultivar found in plant species 710 and plant varieties 712, according to the growth stage and life cycle of the plant. Growth stages 716 contains information about the typical growth stages, or expected growth stages, associated with each plant species and plant variety found in plant species 710 and plant varieties 712. Expected growth stages may be, for example, the growth height, bloom, flowering, and/or any other suitable growth stage indicator used for determining the developmental stage of a particular plant. Life cycles 718 contains information about the typical life cycles associated with each plant species and plant variety found in plant species 710 and plant varieties 712. For example, life cycles 718 may indicate whether a particular plant species or variety is an annual or a perennial. Perennials, especially small flowering plants, grow and bloom over the spring and summer die back every autumn and winter, then return in the spring from their root-stock. Annuals will typically germinate, flower, and die within one year, unless they are prevented from setting seed. Some seedless plants can also be considered annuals even though they do not flower. The life cycle of an individual plant varies and depends upon the point in the growing season as well as the type of plant species and variety.

Object database 720 contains fixed information about objects that may be identified in an operating environment, which may be used to classify identified objects in the environment. This fixed information may include attributes of classified objects, for example, an identified object with attributes of tall, narrow, vertical, and cylindrical, may be associated with the classification of "tree trunk." Fixed knowledge base 702 may contain further fixed operating environment information. Fixed knowledge base 702 may be updated based on information from learned knowledge base 706.

Pruning patterns 722 contains information about how to prune a particular plant variety and/or species. Pruning patterns 722 may include a heading back cut, a thinning out cut, a topping off cut, deadheading, and/or any other suitable pruning method. A heading back cut is a pruning pattern that cuts back to an intermediate point of growth. A thinning out cut is a pruning pattern that cuts back to some point of origin, such as removal of an entire shoot, limb, or branch at its point of origin on the plant. A topping off cut is a pruning pattern that involves removing all branches and growths down to a few large branches or to the trunk of the tree. Deadheading is a pruning pattern that removes spent flowers or flower heads for aesthetics, to prolong bloom for up to several weeks or promote re-bloom, or to prevent seeding.

Cultivation methods 724 contains information about how to cultivate a particular plant variety and/or species. Cultivation methods 724 may include information on how to perform certain tasks, such as, without limitation tilling or working the soil, removing weeds, harvesting plants, and/or any other suitable cultivation task. Different methods for tilling or working the soil may include, without limitation, turning the soil, aerating the soil, and/or any other suitable method of working the soil. For example, working the soil may be necessary when the soil becomes hardened, such as when soil receives moisture and then dries rapidly forming a hardened crust which prevents further moisture from penetrating the soil to reach the plant roots. Cultivation methods 724 may also take into account the root depth of a particular plant when providing appropriate methods for a particular plant variety or species. For example, a plant with shallow roots may require a passive tool for working the soil, such as a hoe, while a plant with a deep root system may allow for the use of an active tool for working the soil, such as a rotor till.

Different methods for removing weeds may include, without limitation, physical methods, chemical methods, and/or any other suitable method for removing weeds. For example, physical methods may include ploughing to cut the roots of the weeds or pulling the weeds up from the soil. Chemical methods may include distributing herbicides across the area in which weeds are growing. Different methods for harvesting may include, without limitation, reaping, picking, cutting, or otherwise removing mature crops, fruit, vegetables, flowers, and/or any other plant yield.

Winterization methods 726 contains information about how to winterize a particular plant variety and/or species. Winterization methods 726 may include methods such as, without limitation, pruning old growth, adding organic matter, blanketing dormant plants for insulation, and/or any other suitable winterization method. For example, blanketing dormant plants may include using shredded leaves, straw, or other suitable organic material to cover the plant to a certain depth, such as insulating a plant with two feet of shredded leaves.

Online knowledge base 704 may be accessed with a communications unit, such as communications unit 420 in FIG. 4, to wirelessly access the Internet. Online knowledge base 704 dynamically provides information to a machine control process which enables adjustment to sensor data processing, site-specific sensor accuracy calculations, and/or exclusion of sensor information. For example, online knowledge base 704 may include current weather conditions of the operating environment from an online source. In some examples, online knowledge base 704 may be a remotely accessed knowledge base. This weather information may be used by control software 430 in machine controller 402 in FIG. 4 to determine which sensors to activate in order to acquire accurate environmental data for the operating environment. Weather, such as rain, snow, fog, and frost may limit the range of certain sensors, and require an adjustment in attributes of other sensors in order to acquire accurate environmental data from the operating environment. Other types of information that may be obtained include, without limitation, vegetation information, such as foliage deployment, leaf drop status, and lawn moisture stress.

Learned knowledge base 706 may be a separate component of horticultural knowledge base 700, or alternatively may be integrated with fixed knowledge base 702 in an illustrative embodiment. Learned knowledge base 706 contains knowledge learned as the mobile utility vehicle spends more time in a specific work area, and may change temporarily or long-term depending upon interactions with online knowledge base 704 and user input. Learned knowledge base includes observed plant growth stage 728, visual plant stress data 730, observed actual water use 732, and per plant prescription 734. Observed plant growth stage 728 contains information collected by a sensor system, such as sensor system 418 in FIG. 4, detecting the actual plant growth stage of an individual plant, such as individual plants 126, 128, and 130 in FIG. 1. The information in observed plant growth stage 728 may be compared to the typical plant growth stage information located in growth stages 716, and used to adjust the treatment and water application to an individual plant. Visual plant stress data 730 contains information collected by a sensor system about an individual plant that is in distress or shows visual signs of stress. The information in visual plant stress data 730 can be used to adjust the treatment and water application of the individual plant in order to address the plant stress observed.

Observed actual water use 732 contains information collected by a sensor system about soil moisture, water retention, and actual amount of water applied. Observed actual water use 732 is learned information about the actual water use of an individual plant that can be used by a processing system, such as utility function 428 in machine controller 402 in FIG. 4, to adjust the amount of water applied in future water use applications.

Per plant prescription 734 contains information about the amount of water and/or other substances that should be applied to each individual plant, such as individual plants 126, 128, and 130 in FIG. 1. Other substances may be, for example, without limitation, fertilizer, plant food, pesticide, and the like. In one illustrative embodiment, per plant prescription 734 is transmitted to a mobile utility vehicle, such as mobile utility vehicle 400 in FIG. 4, either through download module 422 or communications unit 420 in FIG. 4. In another illustrative embodiment, per plant prescription 734 is calculated by a processing system, such as machine controller 402 in FIG. 4, using the learned data from observed plant growth stage 728, visual plant stress data 730, and observed actual water use 732, as well as the fixed data from fixed knowledge base 702. A mobile utility vehicle, such as mobile utility vehicle 400 in FIG. 4, fulfills per plant prescription 734 by moving within the operating environment to collect water from a water source, such as water sources 108 in FIG. 1, and apply the water to the plurality of plants, such as plurality of plants 110 in FIG. 1. Per plant prescription 734 may be instructions for applying a specific amount of water and/or other substances to a plurality of plants. As used herein, per plant refers to one or more individual plants. In these examples, per plant prescription 734 may be directed to an individual plant, such as individual plant 126 in FIG. 1, or may be directed to a plurality of plants, such as plurality of plants 110 in FIG. 1.

In another illustrative example, learned knowledge base 706 may detect the absence of a tree that was present the last time it received environmental data from the work area. Learned knowledge base 706 may temporarily change the environmental data associated with the work area to reflect the new absence of a tree, which may later be permanently changed upon user input confirming the tree was in fact cut down. Learned knowledge base 706 may learn through supervised or unsupervised learning.

The information in horticultural knowledge base 700 may be used to perform classification and plan actions for managing water use. Horticultural knowledge base 700 may be located entirely in a mobile utility vehicle, such as mobile utility vehicle 400 in FIG. 4, or parts or all of horticultural knowledge base 700 may be located in a remote location, such as remote location 106 in FIG. 1, which is accessed by a mobile utility vehicle.

Figure 8:
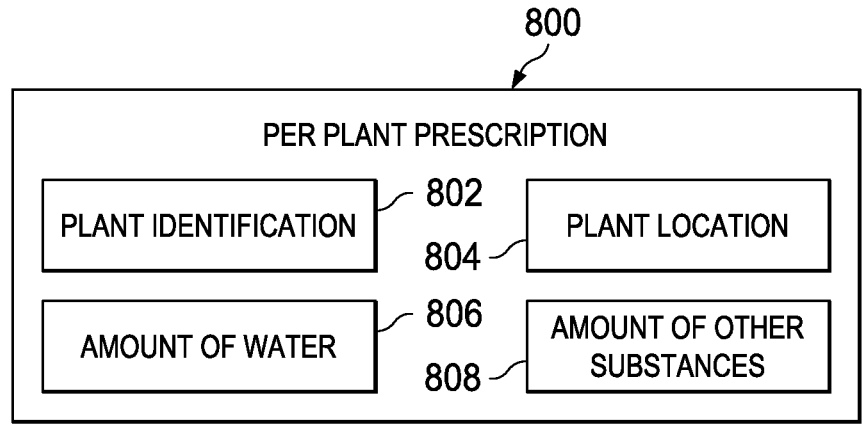
FIG. 8 is a block diagram of a per plant prescription in accordance with an illustrative embodiment.

With reference now to FIG. 8, a block diagram of a per plant prescription is depicted in accordance with an illustrative embodiment. Per plant prescription 800 is an example of one implementation of per plant prescription 734 in FIG. 7.

Per plant prescription 800 contains information about the amount of water and/or other substances that should be applied to each individual plant, such as individual plants 126, 128, and 130 in FIG. 1. Per plant prescription 800 may be instructions for applying a specific amount of water and/or other substances to a plurality of plants. As used herein, per plant refers to one or more individual plants. In these examples, per plant prescription 800 may be directed to an individual plant, such as individual plant 126 in FIG. 1, or may be directed to a plurality of plants, such as plurality of plants 110 in FIG. 1.

As illustrated, per plant prescription 800 includes, for example, plant identification 802, plant location 804, amount of water 806, and amount of other substances 808. These different components of per plant prescription 800 are used to identify the plant to be watered as well as the amount of water and other substances to be applied to that plant.

Plant identification 802 includes information identifying the species and variety of an individual plant or group of plants. The information in plant identification 802 is obtained using components of a fixed knowledge base, such as plant species 710 and plant varieties 712 of fixed knowledge base 702 in FIG. 7, as well as a sensor system, such as sensor system 418 in FIG. 4.

Plant location 804 includes information about the location of a plant or group of plants. For example, plant location 804 may contain information about the location of an individual plant, such as individual plant 126 in FIG. 1, information about the location of a group of plants, such as plurality of plants 110 in FIG. 1, and/or information about the location of an area with a plurality of plants, such as area 132 in FIG. 1.

Amount of water 806 is the amount of water allotted to a plant or group of plants after a utility function has calculated the costs, benefits, and constraints associated with watering a group of plants under current conditions. The utility function may be a software component of a machine controller in a mobile utility vehicle, such as utility function 428 of machine controller 402 in mobile utility vehicle 400 in FIG. 4. Alternatively, in another illustrative embodiment, the utility function may be a software component in a remote location, such as remote location 106 in FIG. 1, where the remote location transmits the calculated amount of water to a mobile utility vehicle in the form a per plant prescription 800.

Amount of other substances 808 includes information about substances other than water that may be applied to a plant of(or?) group of plants. Other substances may be, for example, without limitation, fertilizer, plant food, pesticide, and the like.

In one illustrative embodiment, per plant prescription 800 is transmitted to a mobile utility vehicle, such as mobile utility vehicle 400 in FIG. 4, either through download module 422 or communications unit 420 in FIG. 4. In another illustrative embodiment, per plant prescription 800 is calculated by a processing system, such as utility function 428 in machine controller 402 in FIG. 4, using the learned data from observed plant growth stage 728, visual plant stress data 730, and observed actual water use 732, as well as the fixed data from fixed knowledge base 702 in FIG. 7.

Figure 9:
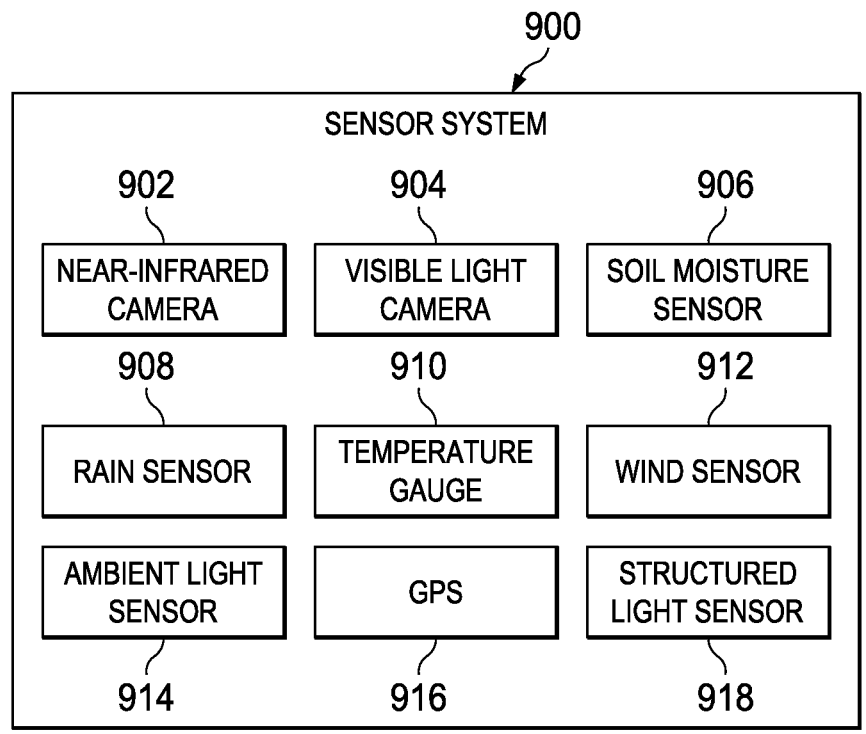
FIG. 9 is a block diagram of a sensor system in accordance with an illustrative embodiment.

With reference now to FIG. 9, a block diagram of a sensor system is depicted in accordance with an illustrative embodiment. Sensor system 900 is an example of one implementation of sensor system 112 in FIG. 1 and sensor system 418 in FIG. 4.

As illustrated, sensor system 900 includes, for example, infrared camera 902, visible light camera 904, soil moisture sensor 906, rain sensor 908, temperature gauge 910, wind sensor 912, ambient light sensor 914, global positioning system 916, and structured light sensor 918. These different sensors may be used to identify the operating environment around a mobile utility vehicle. The sensors in sensor system 900 may be selected such that one of the sensors is always capable of sensing information needed to operate the mobile utility vehicle in different operating environments.

Near-infrared camera 902 may form an image using infrared radiation. Visible light camera 904 may be a standard still-image camera, which may be used alone for color information or with a second camera to generate stereoscopic, or three-dimensional, images. When visible light camera 904 is used along with a second camera to generate stereoscopic images, the two or more cameras may be set with different exposure settings to provide improved performance over a range of lighting conditions. Visible light camera 904 may also be a video camera that captures and records moving images.

The near-infrared images from near-infrared camera 902 and visible light camera 904 may be processed using means known in the art to identify plant species and assess plant health.

Soil moisture sensor 906 detects the current in situ soil moisture information from specific portions of the operating environment.

Rain sensor 908 detects precipitation on an exterior surface of the mobile utility vehicle. In one embodiment, rain sensor 908 includes an infrared beam and an infrared sensor. In this illustrative example, rain sensor 908 operates by beaming an infrared light at a 45-degree angle into a windshield of the mobile utility vehicle from the inside of the mobile utility vehicle. If the windshield is wet, less light makes it back to the sensor, indicating the presence of moisture on the windshield and the likelihood of rain. The illustrative embodiment is not meant to limit the architecture of rain sensor 908. Other rain detection technologies may be used without departing from the spirit and scope of the invention.

Temperature gauge 910 detects the ambient temperature of the operating environment. Wind sensor 912 detects the wind speed in an operating environment. In an illustrative embodiment, temperature gauge 910 and wind sensor 912 are optional features of sensor system 900. The information detected by temperature gauge 910 and wind sensor 912 may alternatively be received from an online knowledge base, such as online knowledge base 704 in FIG. 7. Ambient light sensor 914 measures the amount of ambient light in the operating environment.

Global positioning system 916 may identify the location of the mobile utility vehicle with respect to other objects in the environment. Global positioning system 916 may be any type of radio frequency triangulation scheme based on signal strength and/or time of flight. Examples include, without limitation, the Global Positioning System, Glonass, Galileo, and cell phone tower relative signal strength. Position is typically reported as latitude and longitude with an error that depends on factors, such as ionospheric conditions, satellite constellation, and signal attenuation from vegetation.

Structured light sensor 918 emits light in a pattern, such as one or more lines, reads back the reflections of light through a camera, and interprets the reflections to detect and measure objects in the environment.

In an illustrative embodiment, sensor system 900 receives data from soil moisture sensor 906 identifying the soil moisture of specific portions of the operating environment. The information about the soil moisture is processed by a processor, such as utility function 428 in machine controller 402 in FIG. 4, and optionally displayed to an operator through user interface 426 in FIG. 4. In one illustrative example, user input may be received to adjust a per plant prescription for the individual plant or plants in the specific portion of the operating environment. The user input is then used by a control system, such as control software 430 in machine controller 402 in FIG. 4, to determine which commands to send to the mobile utility vehicle's water application system.

In another illustrative embodiment, machine controller 402 in FIG. 4 receives the soil moisture data from sensor system 900, and interacts with horticultural knowledge base 424 in FIG. 4 in order to determine which commands to send to the mobile utility vehicle's water application system.

Figure 10:
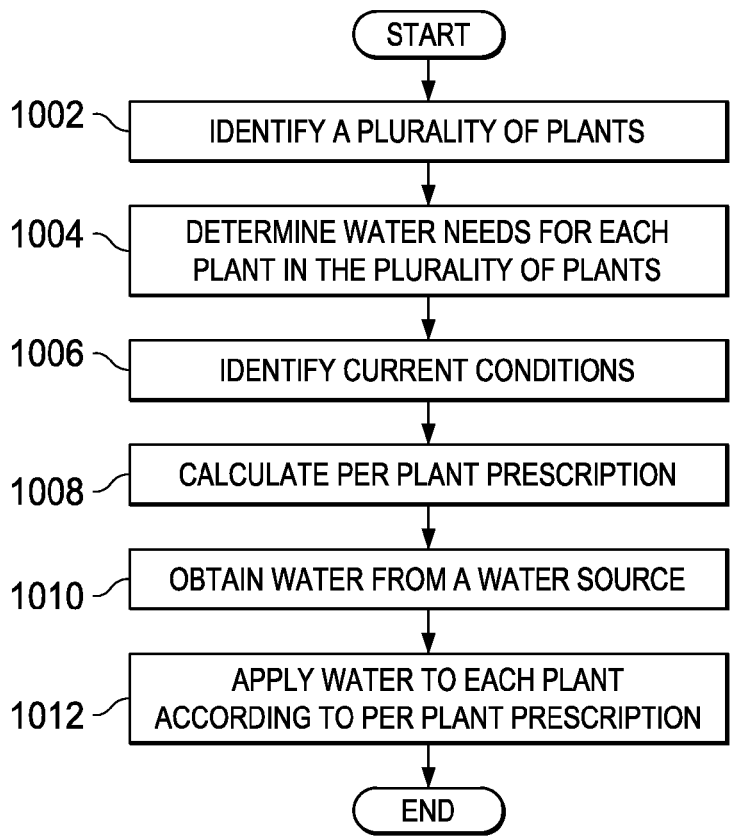
FIG. 10 is a flowchart illustrating a process for managing water use in accordance with an illustrative embodiment.

With reference now to FIG. 10, a flowchart illustrating a process for managing water use is depicted in accordance with an illustrative embodiment. The process in FIG. 10 may be implemented by utility function 428 and control software 430 in machine controller 402 in FIG. 4.

The process begins by identifying a plurality of plants (step 1002). The plurality of plants may be, for example, plurality of plants 110 in FIG. 1. The plurality of plants may contain a number of homogeneous or heterogeneous individual plants, such as individual plants 126, 128, and 130 in FIG. 1. As used herein, a number refers to one or more plants. The plurality of plants may be identified using a knowledge base, such as horticultural knowledge base 700 in FIG. 7. In an illustrative embodiment, the plants may also be identified via a radio frequency identification tag placed in proximity to the plant at the time of planting. The radio frequency identification tag may also have the name of the plant printed for human viewing as is frequently done in gardens.

Next, the process determines water needs for each plant in the plurality of plants (step 1004). Water needs may be determined using a water needs database, such as water needs 714 of horticultural knowledge base 700 in FIG. 7. The process then identifies current conditions (step 1006). Current conditions may be identified using a knowledge base, such as horticultural knowledge base 700 in FIG. 7, and/or a sensor system, such as sensor system 900 in FIG. 9. Current conditions are parameters identifying the state of the area in which watering is to be performed. Parameters for current conditions may include, for example, without limitation, recent rainfall, current rainfall, expected rainfall, soil moisture, drought, rain shortage, wind, cloud cover, shade, direct sunlight, current temperature, visible plant data, and the like.

The process calculates a per plant prescription (step 1008) for the plurality of plants. The per plant prescription may be instructions for applying a specific amount of water and/or other substances to a plurality of plants. As used herein, per plant refers to one or more individual plants. In these examples, a per plant prescription, such as per plant prescription 734 in FIG. 7, may be directed to an individual plant, such as individual plant 126 in FIG. 1, or may be directed to a plurality of plants, such as plurality of plants 110 in FIG. 1.

Next, the process obtains water from a water source (step 1010), such as from one or more of water sources 108 in FIG. 1. The process then applies the water to each plant according to the per plant prescription (step 1012), with the process terminating thereafter.

Figure 11:
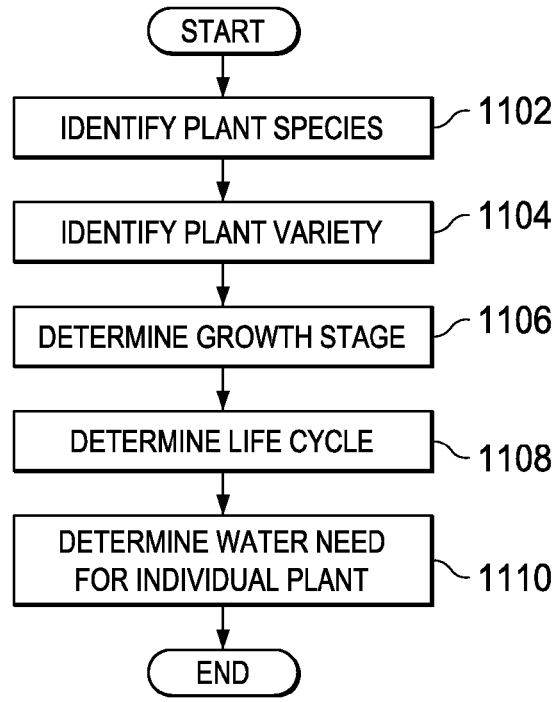
FIG. 11 is a flowchart illustrating a process for determining water needs in accordance with an illustrative embodiment.

With reference now to FIG. 11, a flowchart illustrating a process for determining water needs is depicted in accordance with an illustrative embodiment. The process in FIG. 11 may be implemented by a software component executing on machine controller 402 in FIG. 4 such as horticultural knowledge base 424 and/or sensor system 418 in FIG. 4.

The process begins by identifying a plant species (step 1102). The plant species of an individual plant may be identified using plant species 710 of fixed knowledge base 702 within horticultural knowledge base 700 in FIG. 7. Next, the process identifies the plant variety (step 1104). The plant variety may be identified using plant varieties 712 of fixed knowledge base 702 within horticultural knowledge base 700 in FIG. 7. The individual plant may be identified as part of fixed knowledge base 702, or alternatively, may be identified using sensor system 418 in FIG. 4 in conjunction with horticultural knowledge base 700 in FIG. 7. For example, in one illustrative embodiment, a camera, such as visible light camera 904 of sensor system 900 in FIG. 9, may detect characteristics of an individual plant, such as individual plant 126 in FIG. 1. The characteristics detected may be used in conjunction with the information in plant species 710 and plant varieties 712 of horticultural knowledge base 700 in FIG. 7, in order to identify the plant species.

Next, the process determines the growth stage of the individual plant (step 1106). In one illustrative embodiment, the growth stage is determined using information from growth stages 716 of horticultural knowledge base 700 in FIG. 7. In another illustrative embodiment, the growth stage of the individual plant is determined using a sensor system, such as sensor system 900 in FIG. 9, to detect the observed plant growth stage. In this example, information about the observed plant growth stage is stored in a learned knowledge base, such as learned knowledge base 706 of horticultural knowledge base 700 in FIG. 7, and may later be moved to fixed knowledge base 702 as an update to growth stages 716.

The process then determines the life cycle of the individual plant (step 1108). The life cycle refers to whether the individual plant is an annual or perennial plant, and to the stage of the plant's individual growing cycle. Perennials, especially small flowering plants, grow and bloom over the spring and summer die back every autumn and winter, then return in the spring from their root-stock. Annuals will typically germinate, flower, and die within one year, unless they are prevented from setting seed. Some seedless plants can also be considered annuals even though they do not flower. The life cycle of an individual plant varies and depends upon the point in the growing season as well as the type of plant species and variety.

Finally, the process determines the water need for the individual plant (step 1110) based upon the identified plant species and variety, as well as the determined growth stage and life cycle of the individual plant, with the process terminating thereafter.

Figure 12:
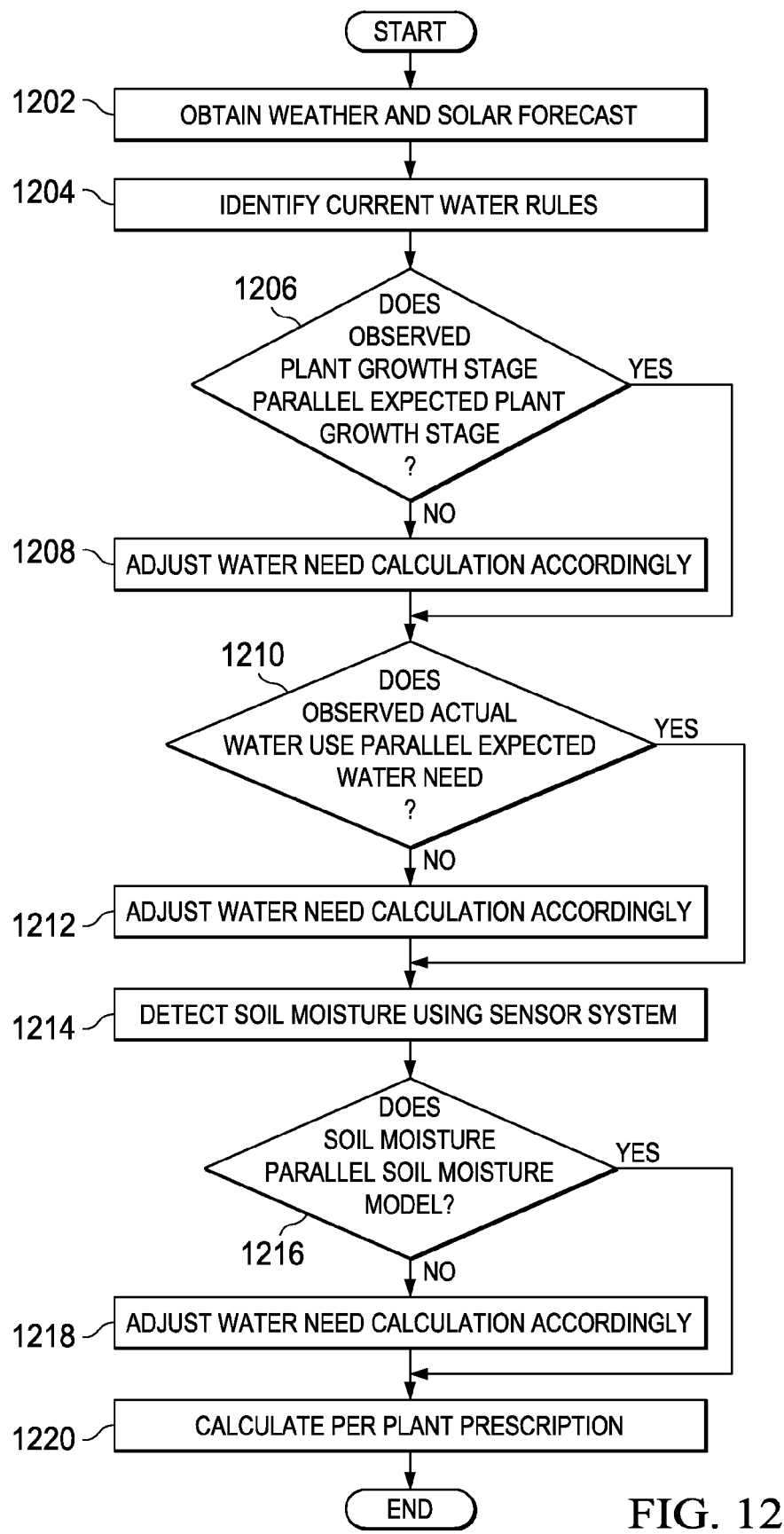
FIG. 12 is a flowchart illustrating a process for identifying current conditions in accordance with an illustrative embodiment.

With reference now to FIG. 12, a flowchart illustrating a process for identifying current conditions is depicted in accordance with an illustrative embodiment. The process in FIG. 12 may be implemented by horticultural knowledge base 424 in machine controller 402 in FIG. 4 alone and/or in conjunction with using sensor system 418 in FIG. 4.

The process begins by obtaining weather and solar forecast information (step 1202). Weather and solar forecast information may be obtained by accessing a database, such as weather and solar forecast 606 in FIG. 6, or by accessing a current weather report using online knowledge base 704 in FIG. 7. Next, the process identifies current water rules (step 1204). Current water rules may be obtained by accessing a database, such as water rules 614 in horticultural task rules 604 of FIG. 6, or by accessing an online water rules system using online knowledge base 704 in FIG. 7.

The process then determines whether the observed plant growth stage parallels the expected plant growth stage (step 1206). The observed plant growth stage may be detected using a sensor system, such as sensor system 900 in FIG. 9. The information about the observed plant growth stage may be accessed in real-time with the sensor system, or may be stored in a learned knowledge base, such as learned knowledge base 706 in FIG. 7. The information may be compared to a fixed database of expected growth stages, such as growth stages 716 in FIG. 7 to determine if the observed growth stage parallels an expected growth stage. If the observed growth stage differs from the expected growth stage, the process adjusts the water need calculation accordingly (step 1208). For example, if the plant is a flowering plant that requires more water once the plant has bloomed, the expected growth stage indicates that a bloom should be present at this developmental stage of the particular plant, but the observed growth stage indicates the plant has not yet bloomed, the adjustment may decrease the water need calculation. Once the adjustment has been made, the process moves to step 1210.

If the observed growth stage parallels the expected growth stage, the process then determines whether the observed actual water use parallels the expected water need (step 1210). The observed actual water use may be detected using a sensor system, such as sensor system 900 in FIG. 9. The information about the observed actual water use may be accessed in real-time with the sensor system, or may be stored in a learned knowledge base, such as learned knowledge base 706 in FIG. 7.

The information may be compared to a fixed database of expected water needs, such as water needs 714 in FIG. 7 to determine if the observed actual water use parallels an expected water need of an individual plant. If the observed actual water use differs from the expected water need, the process adjusts the water need calculation accordingly (step 1212). Once the adjustment has been made, the process moves to step 1214.

If the observed actual water use parallels the expected water need, the process then detects soil moisture using a sensor system (step 1214), such as sensor system 900 in FIG. 9. Then, the process determines whether the soil moisture detected parallels the soil moisture model (step 1216). The soil moisture model contains the ideal soil moisture conditions for an individual plant. The soil moisture may be detected using a sensor, such as soil moisture sensor 906 in FIG. 9. The soil moisture data may be compared to a soil moisture model, such as soil moisture model 608 in FIG. 6 to determine if the soil moisture detected parallels the soil moisture model for an individual plant.

If the soil moisture detected differs from the soil moisture model, the process adjusts the water need calculation accordingly (step 1218). Once the adjustment has been made, the process moves to step 1220.

If the soil moisture detected parallels the soil moisture model, the process then calculates a per plant prescription (step 1220), with the process terminating thereafter.

Figure 13:
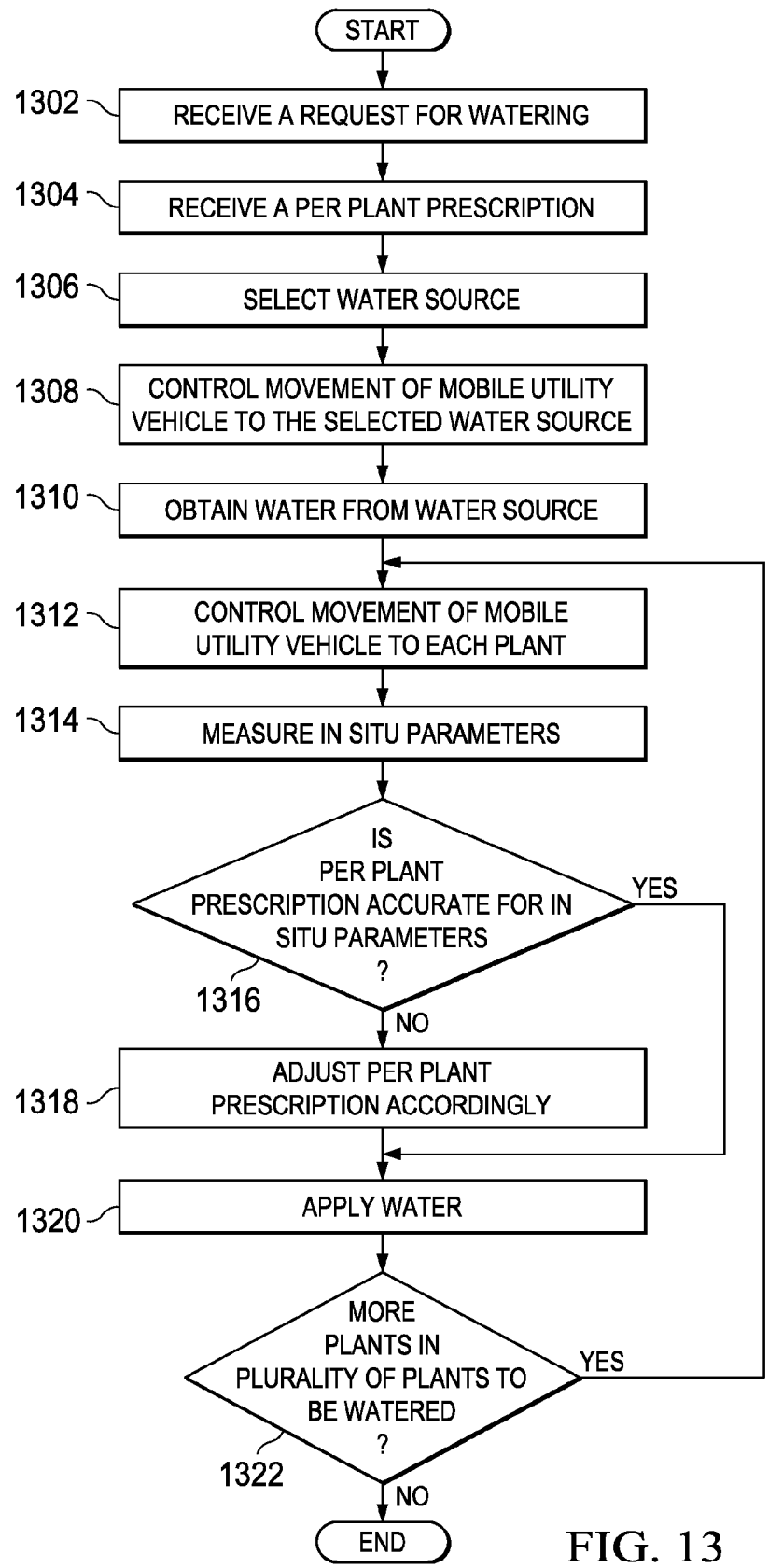
FIG. 13 is a flowchart illustrating a process for watering a plurality of plants in accordance with an illustrative embodiment.

With reference now to FIG. 13, a flowchart illustrating a process for watering a plurality of plants is depicted in accordance with an illustrative embodiment. The process in FIG. 13 may be implemented by control software 430 in machine controller 402 in FIG. 4.

The process begins by receiving a request for watering (step 1302). The request may be received from an operator, such as a garden administrator for example, or from a remote location, such as remote location 106 in FIG. 1. The process receives a per plant prescription (step 1304). The per plant prescription may be received from a knowledge base, such as horticultural knowledge base 424 in FIG. 4, or from a remote location, such as remote location 106 in FIG. 1. The process then selects a water source (step 1306) and controls movement of the mobile utility vehicle to the selected water source (step 1308).

Next, the process obtains water from the water source (step 1310). The process controls movement of the mobile utility vehicle to each plant (step 1312) in the plurality of plants, such as plurality of plants 110 in FIG. 1. Then, the process measures in situ parameters of each plant (step 1314). In situ parameters include, without limitation, soil moisture, visible plant stress, actual water use, plant growth stage, and the like. In situ parameters may be measured using a sensor system, such as sensor system 900 in FIG. 9. The process determines whether or not the per plant prescription is accurate for each plant based on the in situ parameters (step 1316).

For example, in an illustrative embodiment, accuracy may be determined by comparing the expected growth stage of a plant with the observed growth stage of a plant to determine if the current watering prescription meets the observed current condition of the particular plant. In another illustrative embodiment, accuracy may be determined by comparing the expected life cycle of a plant with the observed life cycle of a plant to determine if the current watering prescription meets the observed current life cycle of the particular plant. In this example, if the expected life cycle is a perennial, a plant that grows and blooms over the spring and summer and is expected to die back every autumn and winter, but the observed life cycle indicates the plant is dead and the current operating conditions indicate it is summer, the watering prescription may be inaccurate as the plant is no longer in need of water based on the observed death of the plant. These examples are provided merely to illustrate how different determinations may be made in order to determine an accuracy for a per plant prescription, and are not meant to limit different implementations of the invention in any way. A number of different implementations may be used in order to determine whether or not the per plant prescription is accurate for a given plant.

If the per plant prescription is not accurate for an individual plant based on the in situ parameters, the process adjusts the per plant prescription accordingly (step 1318) and applies water (step 1320). If the per plant prescription is accurate for an individual plant based on the in situ parameters, the process goes directly to step 1320. As used herein, water refers to water and/or other substances that may be applied to plants. Other substances may be, for example, without limitation, fertilizer, herbicide, insecticide, fungicide, plant food, and the like.

Next, the process determines whether there are more plants in the plurality of plants to be watered (step 1322). If there are more plants to be watered, the process returns to step 1312. If there are no more plants to be watered, the process terminates.

Figure 14:
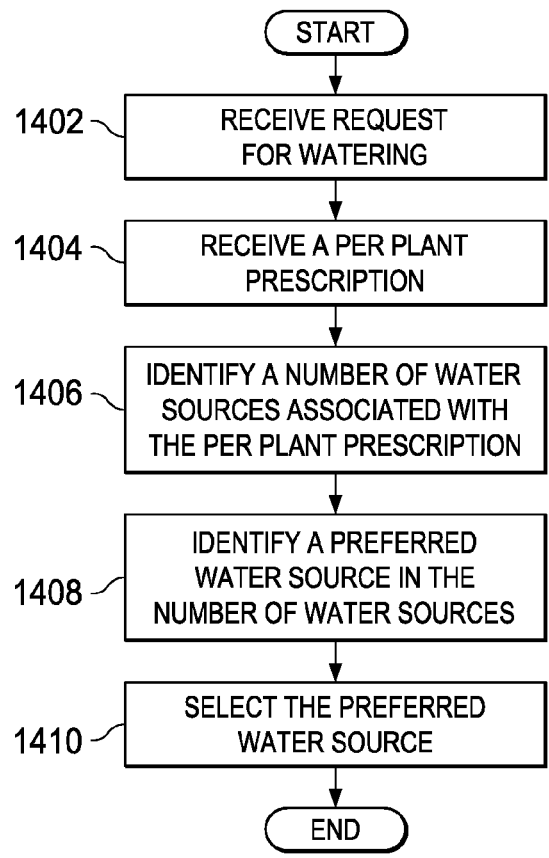
FIG. 14 is a flowchart illustrating a process for selecting a water source in accordance with an illustrative embodiment.

With reference now to FIG. 14, a flowchart illustrating a process for selecting a water source is depicted in accordance with an illustrative embodiment. The process in FIG. 14 may be implemented by control software 430 in machine controller 402 in FIG. 4.

The process begins by receiving a request for watering (step 1402). The request may be received from an operator, such as a garden administrator for example, or from a remote location, such as remote location 106 in FIG. 1. The process receives a per plant prescription (step 1404). The per plant prescription may be received from a knowledge base, such as horticultural knowledge base 424 in FIG. 4, or from a remote location, such as remote location 106 in FIG. 1.

Next, the process identifies a number of water sources associated with the per plant prescription (step 1406), such as water sources 108 in FIG. 1. In an illustrative embodiment, water sources associated with a per plant prescription may refer to one or more water sources which contain the substance or substances required to fulfill the per plant prescription. The process then identifies a preferred water source in the number of water sources (step 1408). A preferred water source may be determined in a number of ways. In one illustrative embodiment, the process may check current water regulations to determine if municipal water sources are accessible or restricted for the time and date for which the watering is requested. Municipal water sources may be the preferred water source, if available, due to lower costs and proximity, for example. If municipal water sources are unavailable, for example due to water restrictions or shortages, the process may then check water levels of other water sources. For example, the process may access water source level database 612 in FIG. 6 to determine the levels of different water sources.

In another illustrative example, the process may check weather and solar forecast 606 in FIG. 6 and determine that recent rainfall may indicate rain barrel 114 in FIG. 1 is likely to be at a high level. Other factors for determining a preferred water source may include, without limitation, proximity and forecast, for example.

The process selects the preferred water source (step 1410), with the process terminating thereafter. The illustrative process in FIG. 14 is not meant to imply physical or architectural limitations on the manner in which different advantageous embodiments may be implemented. Other steps in addition or in place of the ones illustrated may be used. Some steps may be unnecessary in some advantageous embodiments. For example, in some advantageous embodiments a preferred water source may be pre-selected.

Figure 15:
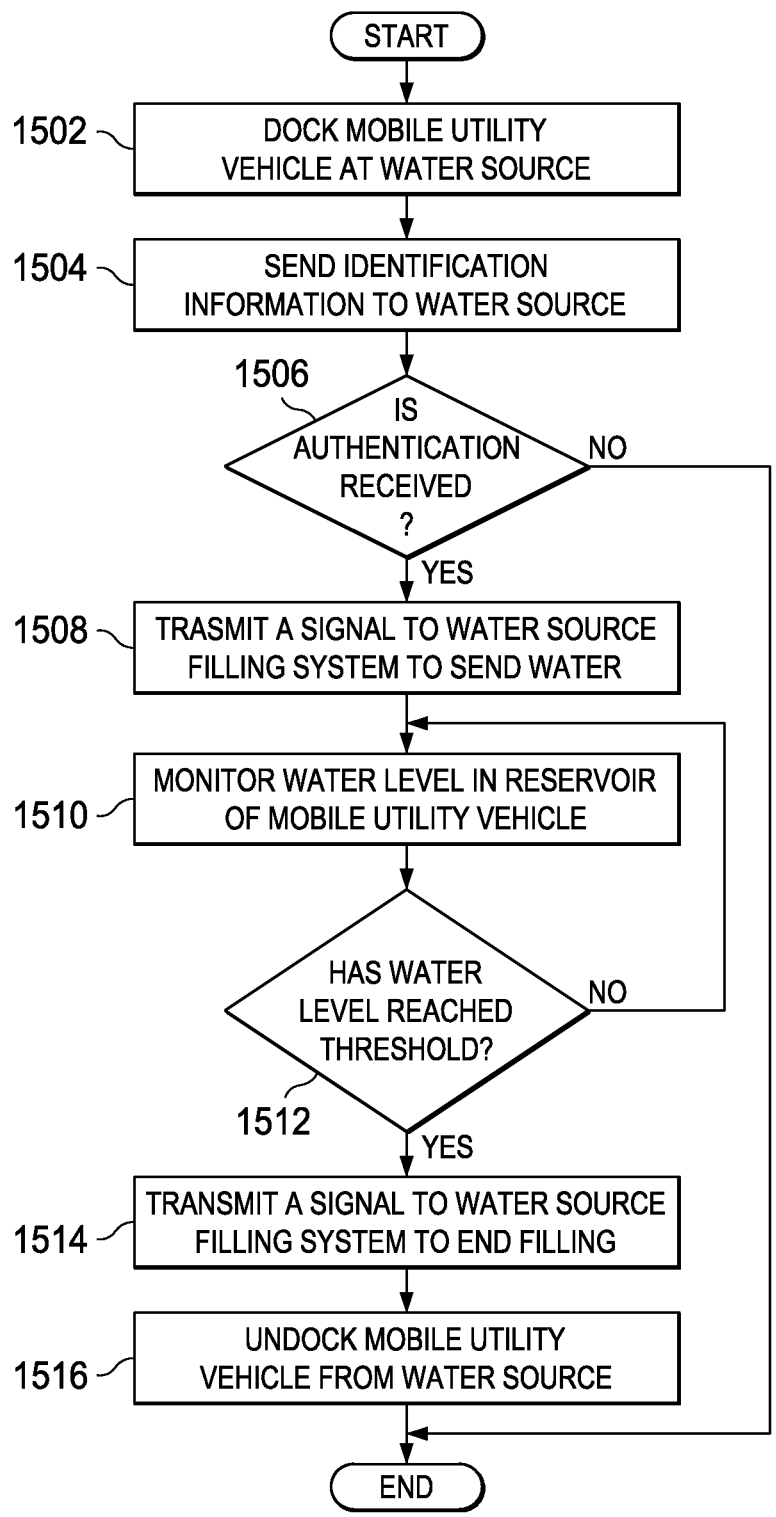
FIG. 15 is a flowchart illustrating a process for obtaining water at a water source in accordance with an illustrative embodiment.

With reference now to FIG. 15, a flowchart illustrating a process for obtaining water at a water source is depicted in accordance with an illustrative embodiment. The process in FIG. 15 may be implemented by control software 430 in machine controller 402 in FIG. 4.

The process begins by docking a mobile utility vehicle at a water source (step 1502). The process sends identification information to the water source (step 1504). Then, the process determines whether or not authentication is received (step 1506) from an authentication system at the water source. If authentication is not received, the process terminates.

If authentication is received, the process transmits a signal to the water source filling system to send water (step 1508) to the mobile utility vehicle. The process monitors the water level in the reservoir of the mobile utility vehicle (step 1510). The process then determines whether the water level in the mobile utility vehicle reservoir has reached a threshold (step 1512). If the threshold has not been reached, the process returns to step 1510.

If the water level has reached a threshold in the mobile utility vehicle reservoir, the process transmits a signal to the water source filling system to end filling (step 1514). The process then undocks the mobile utility vehicle from the water source (step 1516), with the process terminating thereafter.

Figure 16:
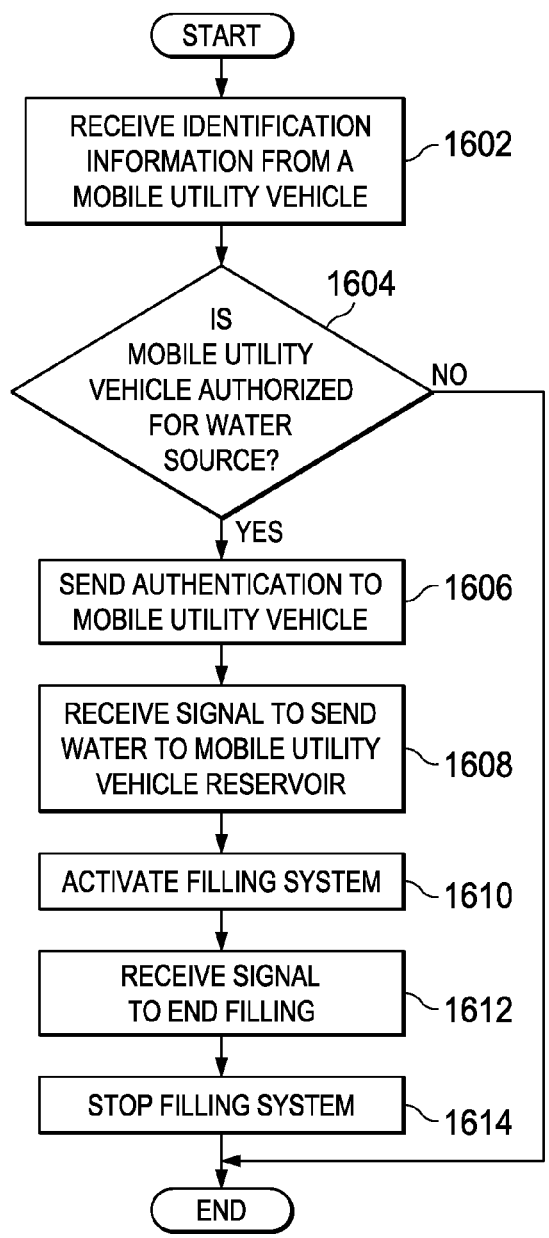
FIG. 16 is a flowchart illustrating a process for releasing water from a water source in accordance with an illustrative embodiment.

With reference now to FIG. 16, a flowchart illustrating a process for releasing water from a water source is depicted in accordance with an illustrative embodiment. The process in FIG. 16 may be implemented by water release system 502 in FIG. 5.

The process begins by receiving identification information from a mobile utility vehicle (step 1602), such as mobile utility vehicle 400 in FIG. 4. The process determines whether the mobile utility vehicle is authorized for the water source (step 1604), such as water source 500 in FIG. 5 for example. If the mobile utility vehicle is not authorized for the water source, the process terminates.

If the mobile utility vehicle is authorized for the water source, the process sends authentication to the mobile utility vehicle (step 1606). The process then receives a signal from the mobile utility vehicle to send water to the mobile utility vehicle reservoir (step 1608). The process activates a filling system (step 1610) of the water source, such as filling system 512 in FIG. 5. The process then receives a signal to end filling (step 1612). The process stops the filling system (step 1614), with the process terminating thereafter.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The illustrative embodiments recognize a need for managing resource delivery to plants according to per plant prescriptions for individual plants and current conditions. In particular, the illustrative embodiments recognize a need for a water delivery system that can obtain water, adjust watering prescriptions according to current conditions, and apply water without human intervention.

The illustrative embodiments recognize that current methods for water application operate in an environment where there is one predominant species of plant, such as a single crop grown in a somewhat uniform environment. The illustrative embodiments recognize that current systems determine amounts of water to apply based on a single species of plant and assume adequate water will be available during the selected watering season.

The illustrative embodiments further recognize that yards and gardens may have multiple plant species with different watering needs in the same or proximate location. Water restrictions may be in place during certain seasons, such as during times of drought, and there may not be enough water available to supply every plant with the required amount of water for survival. The illustrative embodiments recognize that residential water is often more expensive than agricultural irrigation because of treatment costs and distribution infrastructure costs. Gardeners may choose to use water from sources other than municipal water, such as rain barrels or grey water.

Therefore, the illustrative embodiments provide a computer implemented method and system for providing an application of a resource to plants. A plurality of per plant prescriptions for a plurality of plants are received and a source is selected to fulfill the plurality of per plant prescriptions to form a selected source. Movement of a mobile utility vehicle is controlled to the selected source, the resource is obtained, and movement of the mobile utility vehicle is controlled to each plant in the plurality of plants. The resource is applied from the mobile utility vehicle to each plant according to the per plant prescription.

The description of the different advantageous embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for providing an application of a resource to plants, the method comprising:
   receiving a plurality of per plant prescriptions for a plurality of plants, wherein each per plant prescription of the plurality of per plant prescriptions is for a given plant of the plurality of plants;
   responsive to receiving the plurality of per plant prescriptions, selecting a source to fulfill the plurality of per plant prescriptions to form a selected source;
   controlling movement of a mobile utility vehicle to the selected source;
   obtaining the resource from the selected source;
   responsive to obtaining the resource, controlling movement of the mobile utility vehicle to each plant in the plurality of plants; and
   applying the resource from the mobile utility vehicle to the each plant in the plurality of plants according to the per plant prescription.

2. The method of claim 1, further comprising:
   measuring in situ parameters of the each plant in the plurality of plants using a sensor system;

determining whether a per plant prescription in the plurality of per plant prescriptions is accurate for the each plant in the plurality of plants; and responsive to the determination that the per plant prescription is accurate, applying the resource from the mobile utility vehicle to the each plant in the plurality of plants according to the per plant prescription.

3. The method of claim 2, further comprising:

responsive to the determination that the per plant prescription is inaccurate, adjusting the per plant prescription to form an adjusted per plant prescription; and applying the resource from the mobile utility vehicle to the each plant in the plurality of plants according to the adjusted per plant prescription.

4. The method of claim 1, wherein selecting the source further comprises:

identifying a number of sources associated with the plurality of per plant prescriptions;

identifying a preferred source in the number of sources associated with the plurality of per plant prescriptions; and selecting the preferred source.

5. The method of claim 4, wherein the number of sources associated with the plurality of per plant prescriptions comprises at least one source comprising a number of resources required to fulfill the plurality of per plant prescriptions.

6. The method of claim 4, wherein the number of sources comprise a number of resources required to fulfill the plurality of per plant prescriptions, and wherein the number of resources comprise at least one of water, fertilizer, herbicide, insecticide, fungicide, nutrients, and plant food.

7. The method of claim 1, wherein selecting the source further comprises at least one of:

determining current resource rules;

determining current resource levels of a number of resource sources;

determining a resource source with the most proximity to the mobile utility vehicle; and determining the resource source currently available to the mobile utility vehicle.

8. The method of claim 7, wherein the current resource rules include water rules, and wherein the water rules include at least one of an amount of water currently accessible, local water shortage information, and local water restriction information.

9. The method of claim 1, wherein obtaining the resource from the source selected further comprises:

authenticating the mobile utility vehicle with the source selected;

sending a signal to the source selected to send the resource to the mobile utility vehicle;

monitoring a resource level in a reservoir of the mobile utility vehicle; and sending a signal to the source selected to stop sending the resource to the mobile utility vehicle.

10. The method of claim 9, wherein authenticating the mobile utility vehicle with the source selected further comprises:

the mobile utility vehicle sending identification information to the source selected; and the mobile utility vehicle receiving authentication from the source selected.

11. A system for applying an application of a resource to plants, the system comprising:

a machine controller capable of controlling at least one mobile utility vehicle for executing a plurality of per plant prescriptions for a plurality of plants, wherein the machine controller controls movement of the at least one mobile utility vehicle to each plant in the plurality of plants, measures in situ parameters of the each plant in the plurality of plants using a sensor system, and determines whether a per plant prescription in the plurality of per plant prescriptions is accurate for the each plant in the plurality of plants;

an acquisition system capable of obtaining a resource from a number of sources to fulfill the plurality of per plant prescriptions;

a storage system comprising a reservoir for storing the resource obtained; and an application system capable of applying the resource obtained to the plurality of plants, wherein the machine controller directs the application system to apply the resource to the each plant in the plurality of plants according to the per plant prescription associated with the each plant in response to a determination that the per plant prescription is accurate.

12. The system of claim 11, wherein the sensor system identifies information about the plurality of plants.

13. The system of claim 12, wherein the information about the plurality of plants comprises at least one of soil moisture, precipitation, temperature, wind, ambient light, observed growth stage, plant health, and observed actual water use.

14. The system of claim 11, further comprising:

a pumping system capable of obtaining and applying the resource.

15. The system of claim 11, further comprising:

a valve system capable of obtaining and applying the resource.

16. The system of claim 11, wherein the resource comprises at least one of water, fertilizer, herbicide, insecticide, fungicide, nutrients, and plant food.

17. The system of claim 16, further comprising:

an agitator capable of mixing a number of resources obtained by the acquisition system.

18. The system of claim 11, further comprising:

a communication device capable of receiving input from a number of sensors.

19. The system of claim 11, where the machine controller adjusts the per plant prescription to form an adjusted per plant prescription in response to a determination that the per plant prescription is inaccurate, and wherein the machine controller directs the application system to apply the resource to the each plant in the plurality of plants according to the adjusted per plant prescription in response to a determination that the per plant prescription is inaccurate.

20. The system of claim 11, wherein each per plant prescription of the plurality of per plant prescriptions is for a given plant of the plurality of plants.

* * * * *